(12) United States Patent
Suzuki et al.

(10) Patent No.: US 8,437,929 B2
(45) Date of Patent: May 7, 2013

(54) TRANSMISSION CONTROL SYSTEM AND VEHICLE

(75) Inventors: Takahiro Suzuki, Shizuoka (JP); Kenji Fukushima, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 870 days.

(21) Appl. No.: 12/512,289

(22) Filed: Jul. 30, 2009

(65) Prior Publication Data

US 2010/0030436 A1 Feb. 4, 2010

(30) Foreign Application Priority Data

Aug. 1, 2008 (JP) .................... 2008-199400

(51) Int. Cl.
*B60W 10/04* (2006.01)
*B60W 10/02* (2006.01)
*G06F 19/00* (2011.01)
*B60W 10/06* (2006.01)
*B60W 30/20* (2006.01)

(52) U.S. Cl.
USPC .............................. 701/54; 701/51

(58) Field of Classification Search ............. 701/51–68
See application file for complete search history.

(56) References Cited

U.S. PATENT DOCUMENTS

| 5,369,581 | A | * | 11/1994 | Ohsuga et al. ................ 701/48 |
| 5,935,185 | A | * | 8/1999 | Sawamura et al. ............ 701/54 |
| 6,269,294 | B1 | | 7/2001 | Saito et al. |
| 6,530,861 | B1 | | 3/2003 | Nakashima |
| 2004/0043867 | A1 | * | 3/2004 | Sato et al. .................... 477/144 |
| 2006/0079374 | A1 | * | 4/2006 | Iriyama et al. ............... 477/107 |
| 2006/0080018 | A1 | * | 4/2006 | Shimada et al. ............... 701/51 |
| 2006/0234830 | A1 | * | 10/2006 | Iriyama et al. ............... 477/109 |
| 2006/0243246 | A1 | | 11/2006 | Yokoi |
| 2006/0243247 | A1 | | 11/2006 | Yokoi |

FOREIGN PATENT DOCUMENTS

| CN | 2361505 Y | 2/2000 |
| JP | 59-001853 A | 1/1984 |
| JP | 64-085844 A | 3/1989 |
| JP | 06-017673 A | 1/1994 |
| JP | 3008684 B2 | 2/2000 |
| JP | 2003-294062 A | 10/2003 |
| JP | 3458358 B2 | 10/2003 |
| JP | 3630198 B2 | 3/2005 |
| JP | 2006-083946 A | 3/2006 |
| JP | 2006-336638 A | 12/2006 |
| JP | 2006-336639 A | 12/2006 |

* cited by examiner

*Primary Examiner* — Khoi Tran
*Assistant Examiner* — Dale Moyer
(74) *Attorney, Agent, or Firm* — Keating & Bennett, LLP

(57) ABSTRACT

A transmission control system includes an ECU, a throttle actuator, a clutch actuator, and a shift actuator. The throttle actuator adjusts a throttle opening under control of the ECU, the clutch actuator adjusts a state of a clutch under control of the ECU, and the shift actuator changes a gear position of a transmission under control of the ECU. When the transmission is shifted down, a throttle opening is adjusted to a first value and the clutch is disconnected such that a rotational speed of an engine increases. Then, the gear position of the transmission is moved to a lower position by one stage with the clutch being disconnected. After that, the throttle opening is decreased to a second value, and connection of the clutch is started. The second value is set to a value larger than a minimum value.

12 Claims, 12 Drawing Sheets

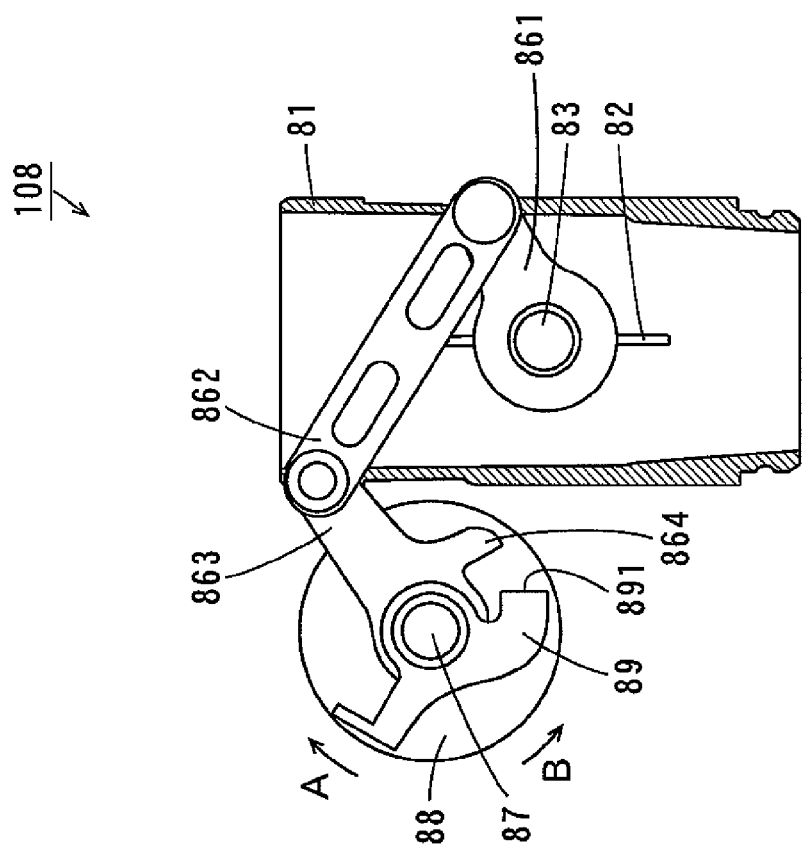
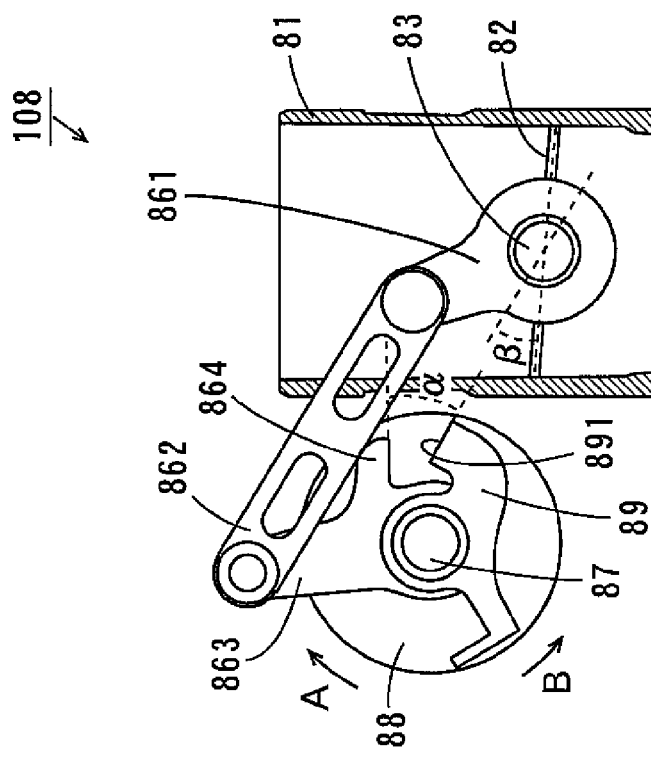
FIG. 3A
FIG. 3B

F I G. 6
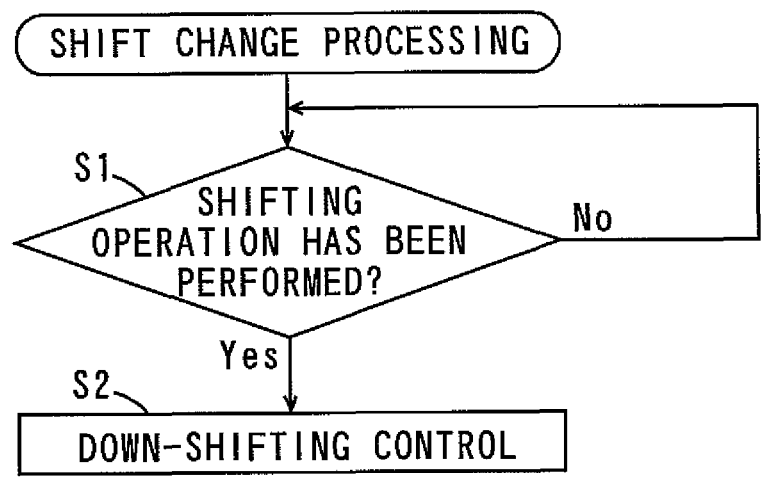

TRANSMISSION CONTROL SYSTEM AND VEHICLE

BACKGROUND OF THE INVENTION

1. Field of the Invention

The present invention relates to a transmission control system of a vehicle and a vehicle including the same.

2. Description of the Related Art

There has been developed a transmission control device that controls an output of an engine at the time of a speed change in a vehicle including an automatic transmission (see JP 3008684 B, for example).

In the transmission control device of the automatic transmission described in JP 3008684 B, increasing the output of the engine at the time of down-shifting the automatic transmission with an accelerator being substantially tuned off suppresses a shift shock generated in the vehicle.

Such an output adjustment of the engine is performed using an electronic throttle system, for example. An opening of a throttle valve is quickly and appropriately adjusted by an actuator in the electronic throttle system. This allows an appropriate amount of air to be supplied to the engine and a combustion state of an air-fuel mixture in the engine to be stabilized. This results in lower fuel consumption of the engine and a cleaner exhaust gas.

In the foregoing electronic throttle system, however, the output adjustment of the engine cannot be performed in the case where the actuator does not operate due to any reason. Therefore, an electronic throttle system capable of mechanically and electrically adjusting the opening of the throttle valve has been developed in order to solve such a problem (see JP 2006-336639 A).

The electronic throttle valve system described in JP 2006-336639A includes the throttle valve, a controller, an electric motor and a guard mechanism. The electric motor is coupled to a valve stem of the throttle valve. The valve stem of the throttle valve is coupled to a throttle grip through the guard mechanism and a throttle cable.

In the electronic throttle valve system, the electric motor is electrically controlled by the controller according to an operation amount of the throttle grip. This causes the valve stem of the throttle valve to rotate and the opening of the throttle valve to be adjusted.

In addition, the guard mechanism is mechanically rotated according to the operation amount of the throttle grip. When the electric motor is not in operation, rotation of the guard mechanism is transmitted to the valve stem. Accordingly, the opening of the throttle valve can be adjusted even when the electric motor is not in operation.

In the throttle valve system described in JP 2006-336639 A, a rotation angle of the valve stem is restricted by the guard mechanism. Specifically, when the throttle grip is not operated by a driver, the valve stem can hardly be rotated.

Therefore, the output of the engine cannot be sufficiently increased when the throttle grip is not operated by the driver even though the throttle valve system described in JP 2006-336639 A is provided in the vehicle including the transmission control device described in JP 3008684 B, for example. In this case, the shift shock cannot be sufficiently suppressed, degrading a driving feeling of the vehicle.

SUMMARY OF THE INVENTION

In order to overcome the problems described above, preferred embodiments of the present invention provide a transmission control system capable of sufficiently suppressing and preventing a shift shock and a vehicle including the same.

According to a preferred embodiment of the present invention, a transmission control system includes a detection device arranged to detect a down-shifting operation, a throttle opening adjustment mechanism arranged to adjust an opening of a throttle valve, a shift mechanism arranged to change a gear position of a transmission, a clutch actuation mechanism arranged to switch a state of a clutch between a disconnection state and a transmission state, and a controller arranged to control the throttle opening adjustment mechanism, the shift mechanism and the clutch actuation mechanism, wherein the controller performs, after the detection device detects the down-shifting operation, a first control operation to increase the opening of the throttle valve to a first value by operation of the throttle opening adjustment mechanism and a second control operation to switch the clutch to the disconnection state by the clutch actuation mechanism, and after the clutch is switched to the disconnection state, the controller performs a third control operation to change the gear position of the transmission by operation of the shift mechanism and a fourth control operation to decrease the opening of the throttle valve to a second value that is smaller than the first value and larger than a minimum value by operation of the throttle opening adjustment mechanism, and performs a fifth control operation to switch the clutch to the transmission state by operation of the clutch actuation mechanism after the opening of the throttle valve is decreased to the second value.

In the transmission control system, the opening of the throttle valve is increased to the first value by operation of the throttle opening adjustment mechanism and the clutch is switched to the disconnection state by the clutch actuation mechanism after the detection device detects the down-shifting operation. After the clutch is switched to the disconnection state, the gear position of the transmission is changed by the shift mechanism and the opening of the throttle valve is decreased to the second value that is smaller than the first value and larger than the minimum value by operation of the throttle opening adjustment mechanism. After the opening of the throttle valve is decreased to the second value, the clutch is switched to the transmission state by the clutch actuation mechanism.

In this case, a rotational speed of an engine is increased after the down-shifting operation is detected, so that the rotational speed of the engine can be brought close to a rotational speed suitable for the transmission after gear change. This prevents an occurrence of a shift shock in a vehicle when the clutch is brought into the transmission state.

Moreover, after the clutch is switched to the disconnection state, the opening of the throttle valve is adjusted to the second value without being set to the minimum value in the transmission control system. This prevents an output decrease in the engine before the clutch is switched to the transmission state, thus allowing the rotational speed of the engine to be sufficiently brought close to the rotational speed suitable for the transmission after the gear change. As a result, an occurrence of the shock in the vehicle can be prevented even though the duration of a half clutch state is shortened at the time of connection of the clutch.

This allows for quick down-shifting with no shift shock occurring in the vehicle.

The second value may preferably be set to such a value that a torque generated in an engine is not more than a running resistance of a vehicle.

When the torque generated in the engine is not more than a running resistance of the vehicle, the vehicle is not accelerated even in a clutch connection state. Thus, acceleration of the vehicle at the time of the connection of the clutch can be sufficiently prevented according to the transmission control system. This sufficiently prevents a driving feeling of the vehicle from being degraded.

The second value may be set to such a value that a torque generated in an engine is substantially zero. In this case, acceleration of the vehicle at the time of the connection of the clutch can be reliably prevented.

The controller may control, when performing the first control, the opening of the throttle valve such that a torque generated in an engine is not more than running resistance of a vehicle until the clutch is disconnected.

In this case, the torque generated in the engine can be prevented from being greater than the running resistance of the vehicle in a time period from the start of down-shifting control by the controller to disconnection of the clutch. Thus, acceleration of the vehicle after the start of the down-shifting control can be prevented. This sufficiently prevents the driving feeling of the vehicle from being degraded.

The controller may control, when performing the fourth control operation, the opening of the throttle valve such that the opening of the throttle valve is not smaller than the second value.

In this case, a decrease in the rotational speed of the engine at the time of the connection of the clutch can be reliably prevented. This reliably prevents occurrence of the shift shock in the vehicle at the time of the connection of the clutch.

The clutch may include a first rotation plate that is rotated by a torque generated by an engine, and a second rotation plate that comes in contact with the first rotation plate to transmit the torque generated by the engine to the transmission, and the controller performs, after the clutch is set in the transmission state by the fifth control operation, a sixth control operation to maintaining the opening of the throttle valve at the second value by operation of the throttle opening adjustment mechanism until a difference of a rotational speed between the first rotation plate and the second rotation plate is not more than a preset value.

In the transmission control system, the opening of the throttle valve is maintained at the second value until the difference of the rotational speed between the first and second rotation plates is sufficiently decreased and the rotational speeds of the first and second rotation plates are sufficiently stabilized. This more reliably prevents the occurrence of the shock in the vehicle at the time of the connection of the clutch.

The clutch may preferably include a first rotation plate that is rotated by a torque generated by an engine, and a second rotation plate that comes in contact with the first rotation plate to transmit the torque generated by the engine to the transmission, and the controller starts connection of the clutch, and then brings the first and second rotation plates into close contact with each other by the clutch actuation mechanism to completely connect the clutch when a state in which a difference of a rotational speed between the first rotation plate and the second rotation plate is smaller than a preset value continues for a preset time period or more.

In the transmission control system, the clutch is fully connected after the difference of the rotational speed between the first and second rotation plates is sufficiently reduced and the rotational speeds of the first and second rotation plates are sufficiently stabilized. Thus, the occurrence of the shock in the vehicle at the time of the connection of the clutch can be more reliably prevented.

The clutch may preferably include a first rotation plate that is rotated by a torque generated by an engine, and a second rotation plate that comes in contact with the first rotation plate to transmit the torque generated by the engine to the transmission, and the controller starts connection of the clutch, and then sets the opening of the throttle valve to the minimum value by operation of the throttle opening adjustment mechanism when a state in which a difference of a rotational speed between the first rotation plate and the second rotation plate is smaller than a preset value continues for a preset time period or more.

In the transmission control system, the opening of the throttle valve is set to the minimum value after the difference of the rotational speed between the first and second rotation plates is sufficiently decreased and the rotational speeds of the first and second rotation plates are sufficiently stabilized. Thus, the decrease in the rotational speed of the first rotation plate when the opening of the throttle valve attains the minimum value is prevented. This more reliably prevents the occurrence of the shift shock in the vehicle at the time of the connection of the clutch.

The clutch may preferably include a first rotation plate that is rotated by a torque generated by an engine, and a second rotation plate that is provided so as to be in contact with and separated from the first rotation plate and comes in contact with the first rotation plate to transmit the torque generated by the engine to the transmission, the clutch actuation mechanism is a mechanism arranged to switch the clutch between the disconnection state and the transmission state by adjusting a distance of the second rotation plate from the first rotation plate, and the controller performs, after the clutch is set in the transmission state by the fifth control, an additional control operation to maintain the opening of the throttle valve at the second value by operation of the throttle opening adjustment mechanism until the distance of the second rotation plate from the first rotation plate is not more than a predetermined value.

In the transmission control system, the clutch is set in the transmission state, and the opening of the throttle valve is then maintained at the second value until the distance of the second rotation plate from the first rotation plate is not more than the predetermined value. This more reliably prevents the occurrence of the shock in the vehicle at the time of the connection of the clutch.

The controller may preferably adjust the opening of the throttle valve by operation of the throttle opening adjustment mechanism such that a torque generated in an engine is not more than a running resistance of a vehicle when the clutch is disconnected.

In this case, acceleration of the vehicle before disconnection of the clutch can be prevented. This reliably prevents the driving feeling of the vehicle from being degraded.

A vehicle may include an accelerator operator that is operated by a driver, the controller adjusts the opening of the throttle valve by operation of the throttle opening adjustment mechanism based on an operation amount of the accelerator operator by the driver when shift change of the transmission is not performed, and wherein the transmission control system is operated in synchronization with the accelerator operator and further includes a coupling mechanism that is mechanically coupled to the throttle valve, and the throttle valve is operated in synchronization with the coupling mechanism when not being driven by operation of the throttle opening adjustment mechanism.

In the transmission control system, the opening of the throttle valve is adjusted by operation of the throttle opening adjustment mechanism based on the operation amount of the accelerator operator when the shift change of the transmission is not performed. In this case, the opening of the throttle valve can be appropriately adjusted, thus improving the driving feeling of the vehicle.

When the throttle valve is not driven by operation of the throttle opening adjustment mechanism, the throttle valve is operated in synchronization with operation of the accelerator operator. Accordingly, the driver can close the throttle valve by operating the accelerator operator even when the opening of the throttle valve cannot be adjusted by the controller.

The transmission control system may further include a restriction mechanism arranged to restrict, when the operation amount of the accelerator operator is zero, the opening of the throttle valve to a third value that is preset, wherein the second value is smaller than the third value.

In the transmission control system, the throttle valve can be prevented from being wide open against the driver's will when the accelerator operator is not operated by the driver.

Moreover, the second value is smaller than the third value; therefore, the rotational speed of the engine can be easily brought close to the rotational speed suitable for the transmission after the gear change even though the down-shifting operation is performed by the driver while the operation amount of the accelerator operator is zero. Accordingly, occurrence of the shift shock in the vehicle at the time of the connection of the clutch can be prevented. This allows smooth down-shifting even during deceleration of the vehicle.

According to another preferred embodiment of the present invention, a vehicle includes a drive wheel, an engine, a throttle valve arranged to adjust an amount of air supplied to the engine, a transmission arranged to transmit a torque generated by the engine to the drive wheel, a clutch that is provided between the engine and the transmission, and a transmission control system, wherein the transmission control system includes a detection device arranged to detect a down-shifting operation, a throttle opening adjustment mechanism arranged to adjust an opening of the throttle valve, a shift mechanism arranged to change a gear position of the transmission, a clutch actuation mechanism arranged to switch a state of the clutch between a disconnection state and a transmission state, and a controller arranged to control the throttle opening adjustment mechanism, the shift mechanism and the clutch actuation mechanism, wherein the controller performs, after the detection device detects the down-shifting operation, a first control operation to increase the opening of the throttle valve to a first value by operation of the throttle opening adjustment mechanism and a second control operation to switch the clutch to the disconnection state by operation the clutch actuation mechanism, and after the clutch is switched to the disconnection state, the controller performs a third control operation to change the gear position of the transmission by operation of the shift mechanism and a fourth control operation to decrease the opening of the throttle valve to a second value that is smaller than the first value and larger than a minimum value by operation of the throttle opening adjustment mechanism, and performs a fifth control operation to switch the clutch to the transmission state by the clutch actuation mechanism after the opening of the throttle valve is decreased to the second value.

In the vehicle, the torque generated by the engine is transmitted to the drive wheel through the clutch and the transmission. The torque generated by the engine can be adjusted by adjusting the opening of the throttle valve.

In addition, in the transmission control system, the opening of the throttle valve is increased to the first value by operation of the throttle opening adjustment mechanism and the clutch is switched to the disconnection state by the clutch actuation mechanism after the detection device detects the down-shifting operation. After the clutch is switched to the disconnection state, the gear position of the transmission is changed by the shift mechanism and the opening of the throttle valve is decreased to the second value that is smaller than the first value and larger than the minimum value by operation of the throttle opening adjustment mechanism. After the opening of the throttle valve is decreased to the second value, the clutch is switched to the transmission state by the clutch actuation mechanism.

In this case, a rotational speed of the engine is increased after the down-shifting operation is detected, so that the rotational speed of the engine can be brought close to a rotational speed suitable for the transmission after gear change. This prevents occurrence of a shift shock in the vehicle when the clutch is brought into the transmission state.

Moreover, after the clutch is switched to the disconnection state, the opening of the throttle valve is adjusted to the second value without being set to the minimum value in the transmission control system. This prevents an output decrease in the engine before the clutch is switched to the transmission state, thus allowing the rotational speed of the engine to be sufficiently brought close to the rotational speed suitable for the transmission after the gear change. As a result, the occurrence of the shock in the vehicle can be prevented even though the duration of a half clutch state is shortened at the time of the connection of the clutch.

This allows for quick down-shifting with no shift shock occurring in the vehicle.

According to various preferred embodiments of the present invention, the rotational speed of the engine is increased when the gear position of the transmission is shifted, so that the rotational speed of the engine can be brought close to the rotational speed suitable for the transmission after the gear change. This prevents the occurrence of the shift shock in the vehicle at the time of the connection of the clutch.

Moreover, the opening of the throttle valve is adjusted to the second value without being set to the minimum value when the connection of the clutch is started. This prevents an excessive decrease in the output of the engine before the clutch is switched to the transmission state even when the opening of the throttle valve cannot be sufficiently increased, thus allowing the rotational speed of the engine to be sufficiently brought close to the rotational speed suitable for the transmission after the gear change. As a result, the occurrence of the shock in the vehicle can be prevented even though the duration of a half clutch state is shortened at the time of switching of the clutch to the transmission state. Here, the half clutch state is a state in which the clutch is in the transmission state while slipping. The transmission state is a state in which the torque of the engine is transmitted to the transmission through the clutch. The disconnection state is a state in which the torque of the engine is not transmitted to the transmission through the clutch.

This allows quick down-shifting with no shift shock occurring in the vehicle.

These and other features, elements, steps, characteristics, and advantages of the present invention will become more apparent from the following detailed description of preferred embodiments of the present invention with reference to the attached drawings.

BRIEF DESCRIPTION OF THE DRAWINGS

FIGS. 3A and 3B are diagrams for explaining operation of the throttle body.

FIG. 6 is a flowchart showing a control operation of an ECU.

DETAILED DESCRIPTION OF THE PREFERRED EMBODIMENTS

Figure 1:
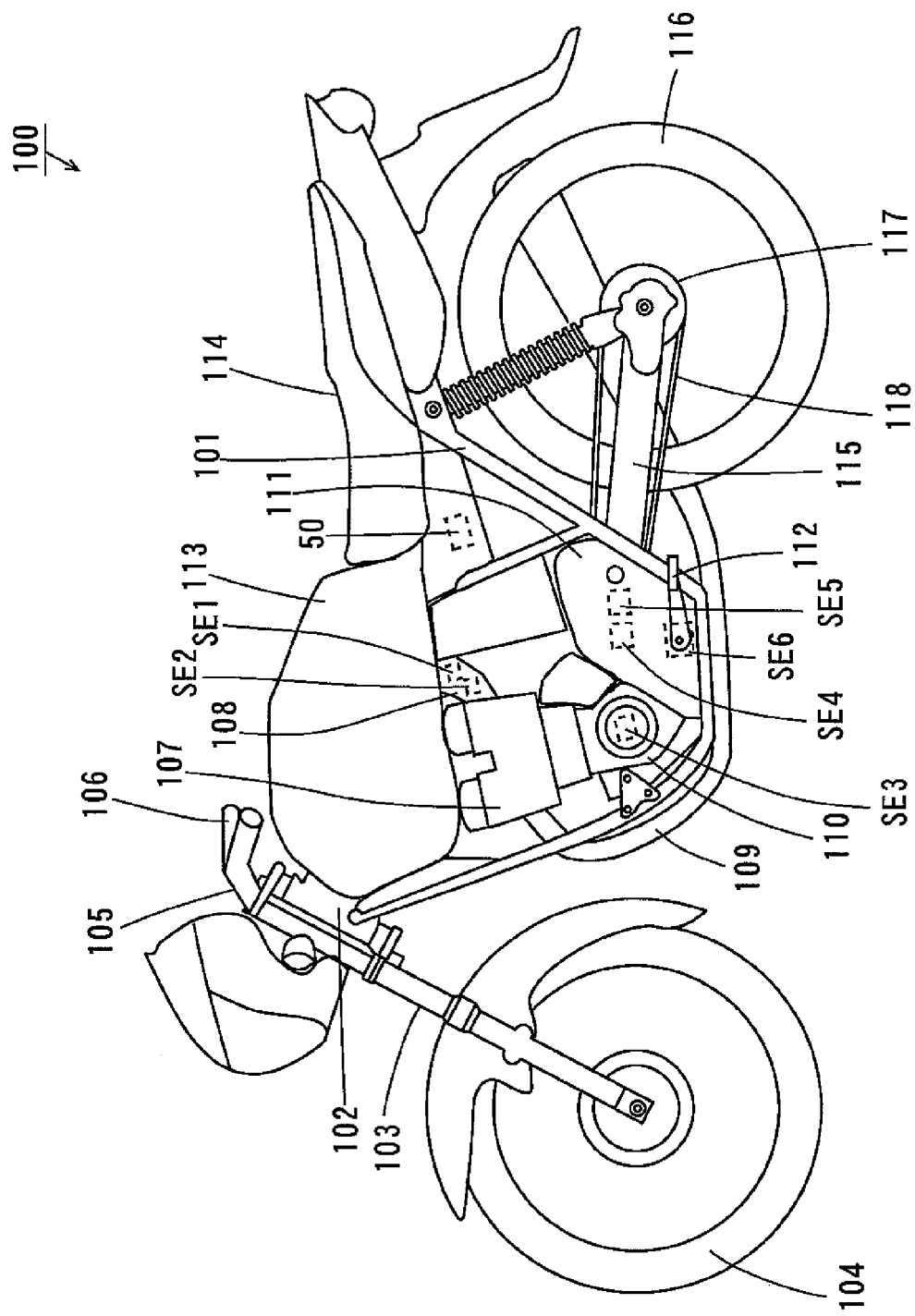
FIG. 1 is a schematic side view showing a motorcycle according to a preferred embodiment of the present invention.

Hereinafter, a transmission control system and a vehicle including the same according to preferred embodiments of the present invention will be described while referring to the drawings. Note that description is made of a motorcycle as one example of the vehicle in the following paragraphs. In addition, description is made of a motorcycle including a semi-automatic transmission control system that performs automatic shift change of a transmission based on a shifting operation by a driver as one example of the transmission control system in the following paragraphs.

(1) Schematic Configuration of the Motorcycle

FIG. 1 is a schematic side view showing the motorcycle according to the present preferred embodiment.

In the motorcycle 100 of FIG. 1, ahead pipe 102 is provided at the front end of a main body frame 101. A front fork 103 is provided at the head pipe 102 so as to be able to swing from side to side. At the lower end of the front fork 103, a front wheel 104 is rotatably supported. A handle 105 is provided at the upper end of the head pipe 102.

The handle 105 is provided with an accelerator grip 106. An engine 107 is provided at the center of the main body frame 101. A throttle body 108 is attached to an intake port of the engine 107, and an exhaust pipe 109 is attached to an exhaust port of the engine 107.

An accelerator opening sensor SE1 and a throttle sensor SE2 are provided in the throttle body 108. The accelerator opening sensor SE1 detects an operation amount of the accelerator grip 106 by a driver (hereinafter referred to as "an accelerator opening"). The throttle sensor SE2 detects an opening of throttle valves 82 (see FIG. 2), described below, (hereinafter referred to as "a throttle opening").

A crankcase 110 is attached to a lower portion of the engine 107. An engine rotational speed sensor SE3 is provided in the crankcase 110. The engine rotational speed sensor SE3 detects a rotational speed of the engine 107.

A transmission case 111 is provided at a lower portion of the main body frame 101. A shift pedal 112 is provided at the transmission case 111. A shift cam rotation angle sensor SE4, a drive shaft rotational speed sensor SE5, a shifting operation detection sensor SE6, a transmission 5 (see FIG. 4), described below, and a shift mechanism 6 (see FIG. 4), described below, are provided in the transmission case 111.

The shift cam rotation angle sensor SE4 detects a rotation angle of a shift cam 6a (see FIG. 4), described below. The drive shaft rotational speed sensor SE5 detects a rotational speed of a drive shaft 5b (see FIG. 4), described below. The shifting operation detection sensor SE6 is coupled to the shift pedal 112 (FIG. 1), and detects an operation of the shift pedal 112 by the driver. For example, a potentiometer, a load sensor, a magnetostrictive sensor or the like can be used as the shifting operation detection sensor SE6.

Note that it is not necessary for the driver to disconnect a clutch 3 (see FIG. 4) to switch a gear position of the transmission 5 in the present preferred embodiment. That is, an automatic transmission control system is provided in the motorcycle 100. Details of the automatic transmission control system will be described below.

A fuel tank 113 is provided above the engine 107 and a seat 114 is provided in the rear of the fuel tank 113. An ECU (Electronic Control Unit) 50 is provided under the seat 114. Values detected by the sensors SE1 to SE6 are applied to the ECU 50. The ECU 50 controls each element of the motorcycle 100 based on the detected values applied from the sensors SE1 to SE6. Details will be described below.

A rear arm 115 is connected to the main body frame 101 so as to extend to the rear of the engine 107. A rear wheel 116 and a rear wheel driven sprocket 117 are rotatably held by the rear arm 115. A chain 118 is attached to the rear wheel driven sprocket 117.

(2) Throttle Body (2-1) Configuration

Figure 2:
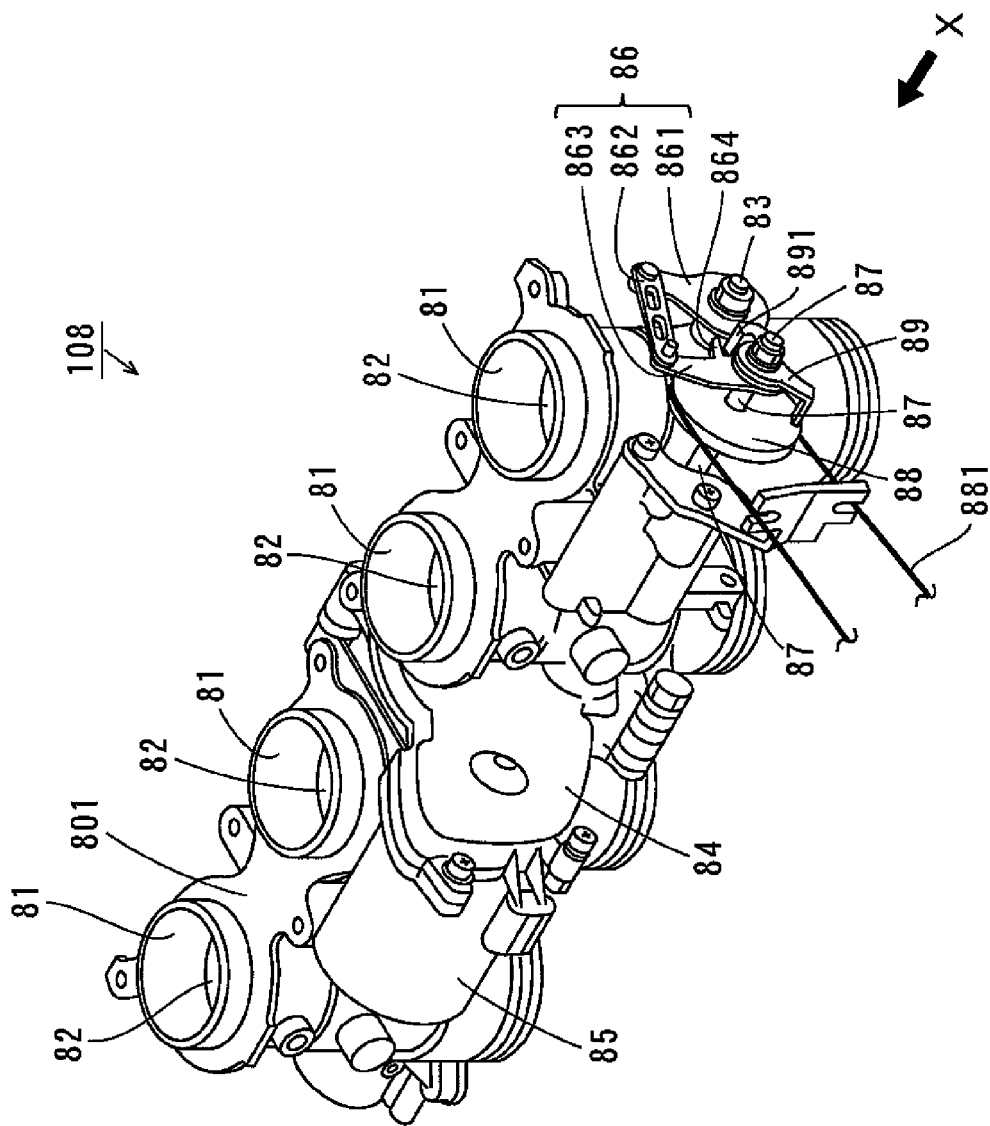
FIG. 2 is a perspective view showing the appearance of a throttle body.

FIG. 2 is a perspective view showing the appearance of the throttle body 108 of FIG. 1.

As shown in FIG. 2, the throttle body 108 preferably includes a main body 801 and four cylindrical air flow paths 81, for example. The four air flow paths 81 are arranged to extend along one direction in the main body 801. The four air flow paths 81 are connected to four intake ports (not shown) of the engine 107 (FIG. 1), respectively. Throttle valves 82 are provided in the respective air flow paths 81. The four throttle valves 82 are fixed to a common throttle shaft 83. The throttle sensor SE2 of FIG. 1 detects a rotation angle of the throttle shaft 83, thereby detecting the opening of the throttle valves 82 (throttle opening).

A gear box 84 is provided at the center of the main body 801. A throttle actuator 85 including an electric motor, for example, is attached to the gearbox 84. An output shaft (not shown) of the throttle actuator 85 is coupled to the throttle shaft 83 through one or plurality of gears accommodated in the gear box 84.

In the present preferred embodiment, the throttle actuator 85 is driven by control of the ECU 50 (FIG. 1) when the driver operates the accelerator grip 106 (FIG. 1). A torque generated by operation of the throttle actuator 85 is transmitted to the throttle shaft 83 through the gears in the gear box 84. Thus, the throttle shaft 83 is rotated and the throttle opening is adjusted to a value corresponding to the accelerator opening. This causes the output of the engine 107 (FIG. 1) to be adjusted.

A rotation shaft 87 is rotatably provided in the main body 801 so as to extend in a direction parallel or substantially parallel to an axial direction of the throttle shaft 83. A pulley 88 is fixed at substantially the center of the rotation shaft 87. An auxiliary arm 89 is fixed to one end of the rotation shaft 87.

The throttle shaft 83 and the rotation shat 87 are coupled to each other by a link mechanism 86. The link mechanism 86 includes a first arm 861, a coupling member 862 and a second arm 863.

One end of the first arm 861 is fixed to one end of the throttle shaft 83. The other end of the first arm 861 is rotatably attached to one end of the coupling member 862. The other end of the coupling member 862 is rotatably attached to one end of the second arm 863. An engaging portion 864 is formed at the center of the second arm 863 so as to project toward the side of the first arm 861.

The rotation shaft 87 is rotatably attached to the main body 801 so as to extend in the direction parallel or substantially parallel to the axial direction of the throttle shaft 83. The other end of the second arm 863 is rotatably attached to the rotation shaft 87. In addition, the auxiliary arm 89 is fixed to the one end of the rotation shaft 87. The rotation shaft 87 rotates to cause the auxiliary arm 89 to rotate around the rotation shaft 87 as a rotation axis.

An engaging portion 891 is provided at one end of the auxiliary arm 89 so as to project toward the side of the second arm 863. The engaging portion 891 of the auxiliary arm 89 and the engaging portion 864 of the second arm 863 are arranged so as to be engaged with each other in rotational directions of the auxiliary arm 89 and the second arm 863.

The pulley 88 is coupled to the accelerator grip 106 (FIG. 1) through a throttle cable 881. Operation of the accelerator grip 106 by the driver causes rotation of the accelerator grip 106 to be transmitted to the pulley 88 through the throttle cable 881. This causes the pulley 88, the rotation shaft 87 and the auxiliary arm 89 to rotate. The accelerator opening sensor SE1 of FIG. 1 detects the rotation angle of the rotation shaft 87, thereby detecting the accelerator opening.

(2-2) Operation of the Throttle Body

Next, description is made of operation of the throttle body 108.

FIGS. 3A and 3B are diagrams for explaining the operation of the throttle body 108. Note that FIGS. 3A and 3B are partially fragmented sectional views of the throttle body 108 that is seen from a direction indicated by an arrow X of FIG. 2. FIG. 3A shows the opening of the throttle valve 82 being set to a minimum value and FIG. 3B shows the throttle valve 82 being fully opened.

(a) Normal Operation

In the throttle body 108 according to the present preferred embodiment, when the driver causes the accelerator grip 106 (FIG. 1) to rotate in an open direction with the intention of increasing the output of the engine 107 (FIG. 1), the operation is transmitted to the pulley 88 through the throttle cable 881 (FIG. 2). This causes the pulley 88 to rotate in a direction of an arrow A as shown in FIGS. 3A and 3B. Meanwhile, when the driver causes the accelerator grip 106 to rotate in a close direction with the intention of decreasing the output of the engine 107, the pulley 88 is rotated in a direction of an arrow B.

The rotation of the pulley 88 causes the rotation shaft 87 to rotate, because the pulley 88 and the rotation shaft 87 are fixed to each other. The rotation angle of the rotation shaft 87 is detected by the accelerator opening sensor SE1 (FIG. 1), and the detected value (accelerator opening) is applied to the ECU 50 (FIG. 1).

The ECU 50 controls the throttle actuator 85 (FIG. 2) based on the accelerator opening applied from the accelerator opening sensor SE1. This causes the throttle shaft 83 and the throttle valves 82 to rotate and the throttle opening to be adjusted. In this manner, the throttle opening is electrically adjusted by control of the ECU 50 in the normal operation.

As described above, the engaging portion 864 and the engaging portion 891 are arranged so as to be engaged with each other in the rotational directions of the second arm 863 and the auxiliary arm 89. The auxiliary arm 89 rotates in synchronization with the operation of the accelerator grip 106 (FIG. 1) by the driver. Therefore, when the accelerator grip 106 (FIG. 1) is not operated by the driver (the operation amount is zero), the auxiliary arm 89 is fixed at a position shown in FIG. 3A. Accordingly, a range in which the second arm 863 can rotate is restricted to an angle α.

In this case, movement ranges of the first arm 861 and the coupling member 862 are also restricted, so that the rotation angle of the throttle shaft 83 is restricted to an angle β. That is, the throttle opening is prevented from being equal to the angle β or wider when the accelerator grip 106 is not operated in the present preferred embodiment. This prevents the throttle valves 82 from being wide open against the driver's will when the accelerator grip 106 is not operated.

Note that in the normal operation, the auxiliary arm 89 rotates according to the operation of the accelerator grip 106 by the driver, and therefore the engaging portions 864 and 891 do not come in contact with each other. In this case, since the rotation of the second ram 863 is not restricted by the auxiliary arm 89, the operations of the first arm 861 and the coupling member are also not restricted. This allows quick opening/closing of the throttle valves 82.

(b) Preliminary Operation

In the throttle body 108 according to the present preferred embodiment, even though the throttle actuator 85 is stopped for any reason, the driver can close the accelerator grip (FIG. 1) to close the throttle valves 82.

Specifically, when the throttle actuator 85 (FIG. 2) is stopped in a state of FIG. 3B, for example, the driver closes the accelerator grip 106 to cause the auxiliary arm 89 to rotate in the direction of the arrow B (FIGS. 3A and 3B). At this time, the auxiliary arm 89 and the second arm 863 are coupled to each other by a coupling member that is not shown. Thus, the auxiliary arm 89 and the second arm 863 are fixed to each other in the rotational direction (the direction of the arrow B). As a result, the second arm 863 rotates in the direction of the arrow B around the rotation shaft 87 as the rotation axis to close the throttle valves 82. In this manner, the throttle valves 82 are mechanically operated when the throttle opening cannot be adjusted by operation of the throttle actuator 85.

Note that when the auxiliary arm 89 and the second arm 863 are coupled to each other by the coupling member, the angle between the engaging portion 864 and the engaging portion 891 is maintained at α (see FIG. 3A), for example. In this case, the driver closes the accelerator grip 106 to cause the second arm 863 to sufficiently rotate. Accordingly, the throttle valves 82 can be reliably closed.

In this manner, the driver operates the accelerator grip 106 to easily cause the throttle valves 82 to be closed even when the throttle actuator 85 cannot be used in the throttle body 108 according to the present preferred embodiment.

(3) Configurations of the Transmission and the Shift Mechanism

Next, description is made of the transmission and the shift mechanism provided in the transmission case 111 of FIG. 1.

Figure 4:
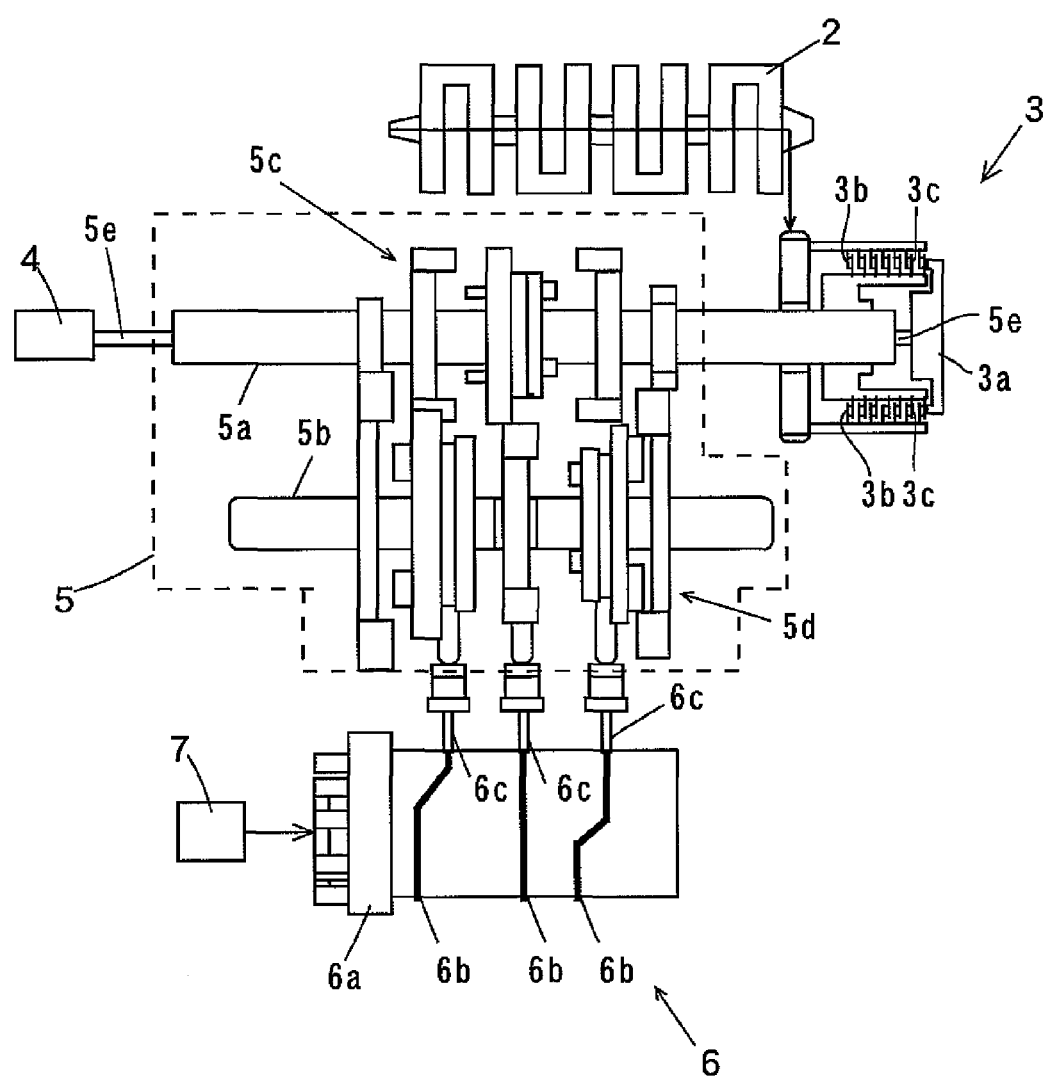
FIG. 4 is a diagram showing the configurations of a transmission and a shift mechanism.

FIG. 4 is a diagram showing the configurations of the transmission and the shift mechanism.

As shown in FIG. 4, the transmission 5 includes a main shaft 5a and a drive shaft 5b. Multi-stage (five-stage, for example) transmission gears 5c are attached to the main shaft 5a, and multi-stage transmission gears 5d are attached to the drive shaft 5b.

The main shaft 5a is coupled to a crank 2 of the engine 107 (FIG. 1) through the clutch 3. The clutch 3 includes a pressure plate 3a, a plurality of clutch disks 3b and a plurality of friction disks 3c. The clutch disks 3b are rotated by a torque transmitted from the crank 2. Moreover, the friction disks 3c are coupled to the main shaft 5a and rotate around the main shaft 5a as a rotation axis.

The friction disks 3c are biased by the pressure plate 3a in a direction in which the friction disks 3c come in close contact with the clutch disks 3b. A state in which the torque is transmitted between the plurality of clutch disks 3b and the plurality of friction disks 3c is referred to as a transmission state of the clutch 3, and a state in which the torque is not transmitted between the plurality of clutch disks 3b and the plurality of friction disks 3c is referred to as a disconnection state of the clutch 3 in the following description. Although the torque of the crank 2 is transmitted to the main shaft 5a through the clutch disks 3b and the friction disks 3c in the transmission state of the clutch 3, the torque of the crank 2 is not transmitted to the main shaft 5a in the disconnection state of the clutch 3.

A push rod 5e is inserted into the main shaft 5a. One end of the push rod 5e is coupled to the pressure plate 3a, and the other end thereof is coupled to an electric or hydraulic clutch actuator 4.

In the present preferred embodiment, the push rod 5e is pushed out to the side of the clutch 3 when the clutch actuator 4 is driven by control of the ECU 50. This causes the pressure plate 3a to be pushed to cause the clutch disks 3b and the friction disks 3c to be separated from one another. As a result, the clutch 3 is brought into the disconnection state. Details of the control operation of the ECU 50 will be described below.

The torque transmitted from the crank 2 to the main shaft 5a when the clutch 3 is in the transmission state is transmitted to the drive shaft 5b through the transmission gears 5c and the transmission gears 5d. The chain 118 of FIG. 1 is attached to the drive shaft 5b. The torque of the drive shaft 5b is transmitted to the rear wheel 116 (FIG. 1) through the chain 118 and the rear wheel driven sprocket 117 (FIG. 1). This causes the motorcycle 100 to drive.

A reduction gear ratio between the main shaft 5a and the drive shaft 5b is determined by combination of the transmission gears 5c and the transmission gears 5d. Moreover, the reduction gear ratio between the main shaft 5a and the drive shaft 5b is changed by moving any transmission gears 5c, 5d of the plurality of transmission gears 5c, 5d. The transmission gears 5c, 5d are moved by the shift mechanism 6.

The shift mechanism 6 includes the shift cam 6a. A plurality of cam grooves 6b (for example, three in FIG. 4) are formed in the shift cam 6a. A shift fork 6c is attached to each cam groove 6b. The shift cam 6a is connected to an electric or hydraulic shift actuator 7 through the link mechanism that is not shown.

In the present preferred embodiment, the shift cam 6a is rotated when the shift actuator 7 is driven by control of the ECU 50. This causes each shift fork 6c to move along the cam groove 6b. As a result, any transmission gears 5c, 5d are moved to change the gear position of the transmission 5.

(4) The Transmission Control System

Next, description is made of the transmission control system.

(4-1) Configuration

Figure 5:
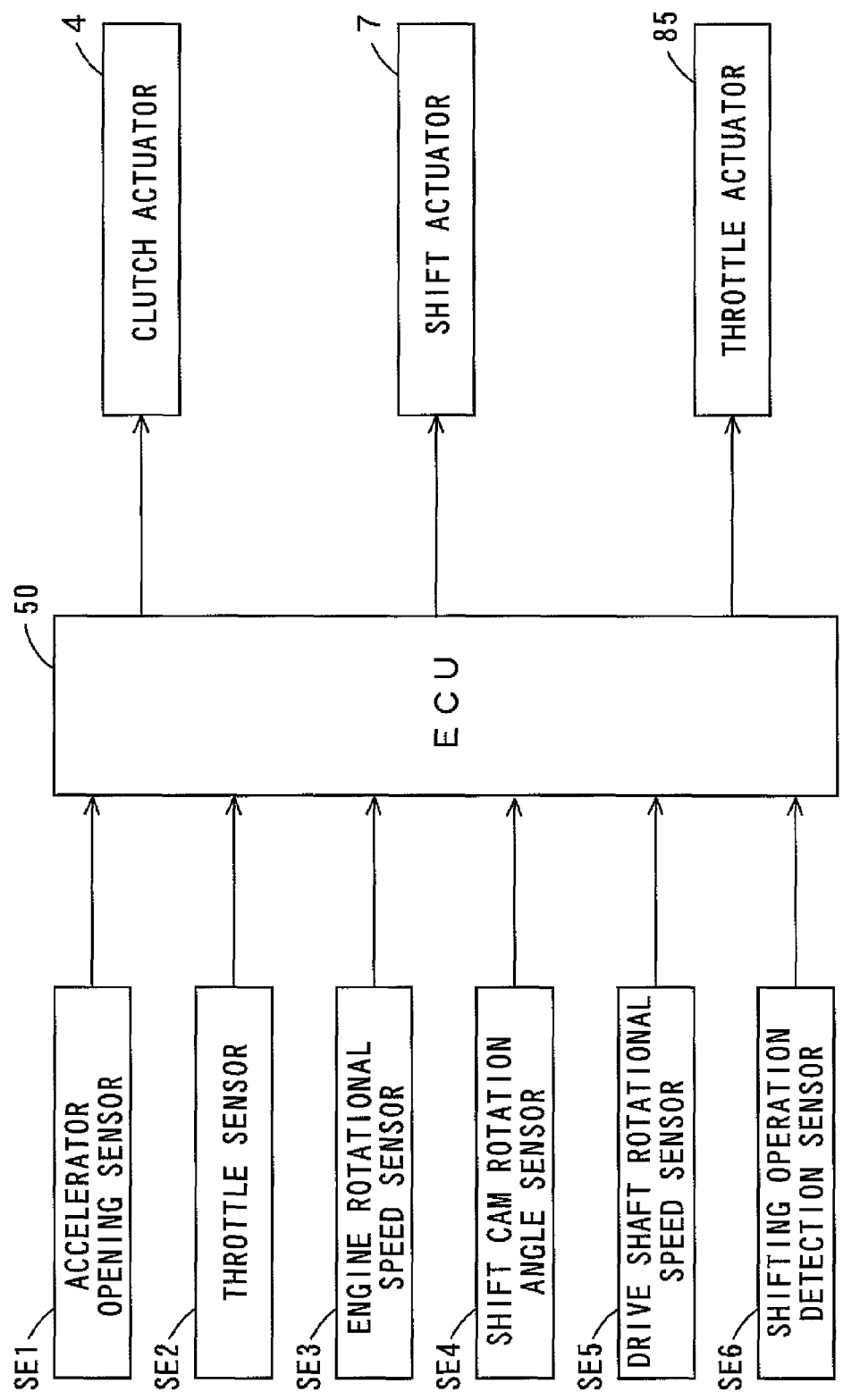
FIG. 5 is a diagram showing the configuration of a transmission control system according to a preferred embodiment of the present invention.

FIG. 5 is a diagram showing the configuration of the transmission control system according to the present preferred embodiment.

As shown in FIG. 5, the transmission control system 200 according to the present preferred embodiment includes the accelerator opening sensor SE1, the throttle sensor SE2, the engine rotational speed sensor SE3, the shift cam rotation angle sensor SE4, the drive shaft rotational speed sensor SE5, the shifting operation detection sensor SE6, the ECU 50, the clutch actuator 4, the shift actuator 7 and the throttle actuator 85.

The accelerator opening sensor SE1 detects the accelerator opening and applies the detected accelerator opening to the ECU 50. The throttle sensor SE2 detects the throttle opening and applies the detected throttle opening to the ECU 50. The engine rotational speed sensor SE3 detects the rotational speed of the engine 107 (FIG. 1) and applies the detected rotational speed to the ECU 50.

The shift cam rotation angle sensor SE4 detects the rotation angle of the shift cam 6a (FIG. 4) and applies the detected rotation angle to the ECU 50. The drive shaft rotational speed sensor SE5 detects the rotational speed of the drive shaft 5b (FIG. 4) of the transmission 5 (FIG. 4) and applies the detected rotational speed to the ECU 50.

The shifting operation detection sensor SE6 detects a direction in which the shift pedal 112 is operated by the driver and applies a signal indicating the detected direction of the operation (a signal indicating up-shifting or a signal indicating down-shifting) to the ECU 50. Note that the shifting operation detection sensor SE6 outputs the signal with a positive value when the up-shifting operation is detected, and outputs the signal with a negative value when the down-shifting operation is detected, for example.

The ECU 50 preferably includes an interface circuit, a CPU (central processing unit), a ROM (read only memory), a RAM (random access memory) and so on, for example. A map representing a relationship between the accelerator opening and the throttle opening is stored in the ROM or the RAM of the ECU 50.

When the shift pedal 112 is not operated by the driver, the ECU 50 controls the throttle actuator 85 based on the accelerator opening detected by the accelerator opening sensor SE1 and the above-mentioned map to adjust the throttle opening in the present preferred embodiment. This causes the output of the engine 107 to be adjusted according to the accelerator opening.

In addition, the ECU 50 modifies a control amount of the throttle actuator 85 based on the throttle opening detected by the throttle sensor SE2. This allows the throttle opening to be adjusted with high accuracy.

When the shift pedal 112 is operated by the driver, the ECU 50 controls the clutch actuator 4, the shift actuator 7 and the throttle actuator 85 based on detection results applied from the sensors SE1 to SE6. This causes the clutch 3, the shift mechanism 6 and the throttle body 108 to be driven, resulting in the shift change of the transmission 5.

Hereinafter, detail description is made of the control operation of the ECU 50 at the time of the shift change of the transmission 5.

(4-2) Control Operation of the ECU

FIG. 6 is a flowchart showing the control operation of the ECU 50.

As shown in FIG. 6, first, the ECU 50 determines whether the driver has performed the down-shifting operation based on the signal output from the shifting operation detection sensor SE6 (Step S1). When the down-shifting operation has not been performed by the driver, the ECU 50 stands by until the down-shifting operation is performed.

The ECU 50 determines whether the down-shifting operation has been performed by the driver based on the output signal from the shifting operation detection sensor SE6.

When the down-shifting operation has been performed, the ECU 50 executes down-shifting control (Step S2).

Next, description is made of the down-shifting control in Step S2 of FIG. 6.

In the down-shifting, the output of the engine 107 is temporarily increased before disconnection of the clutch 3, because the down-shifting is generally performed during deceleration, and the reduction gear ratio between the main shaft 5a (FIG. 4) and the drive shaft 5b (FIG. 4) is increased by the down-shifting.

Specifically, the torque is transmitted from the drive shaft 5b to the main shaft 5a during deceleration. In this case, the output of the engine 107 is temporarily increased, thereby allowing the torque transmitted from the drive shaft 5b to the main shaft 5a to be reduced. This decreases the engaging force between the transmission gears 5c (FIG. 4) and the transmission gears 5d (FIG. 4), allowing the transmission gears 5c or the transmission gears 5d to be easily moved.

In addition, the reduction gear ratio between the main shaft 5a and the drive shaft 5b is increased with the clutch 3 being disconnected, so that the rotational speed of the main shaft 5a is increased. In this case, the output (rotational speed) of the engine 107 is increased, thereby reducing the difference between the rotational speed of the clutch disks 3b (FIG. 4) and the rotational speed of the main shaft 5a (the friction disks 3c (FIG. 4)). This prevents occurrence of the shift shock in the motorcycle 100.

In many cases, the opening of the accelerator grip 106 is set to a minimum value by the driver at the time of the down-shifting. Therefore, in the present preferred embodiment, description is made of a case where the down-shifting is performed while the accelerator grip 106 is not operated. When the opening of the accelerator grip 106 is set to the minimum value, the angle through which the throttle valves 82 (FIG. 3) can be rotated is restricted to the angle β (FIG. 3) in the present preferred embodiment. Therefore, the torque transmitted from the drive shaft 5b to the main shaft 5a cannot be sufficiently reduced in some cases by simply increasing the throttle opening to the angle β. Accordingly, the down-shifting may not be smoothly performed.

Therefore, the inventors developed based on various experiments and simulations a method of controlling the down-shifting in which the smooth down-shifting can be performed even when the operation of the throttle valves 82 is restricted. Hereinafter, details of the down-shifting control is described.

(a) Outline of the Down-Shifting Control

First, an outline of the down-shifting control according to the present preferred embodiment is described with reference to the drawing.

Figure 7A:
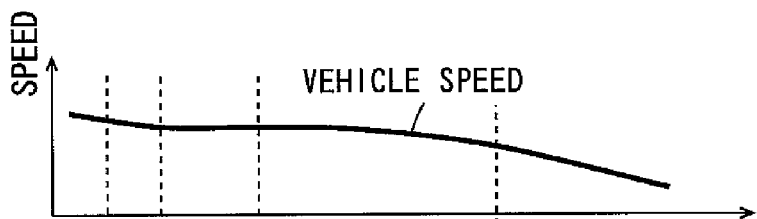
FIGS. 7A-7E are diagrams for explaining down-shifting control.
Figure 7B:
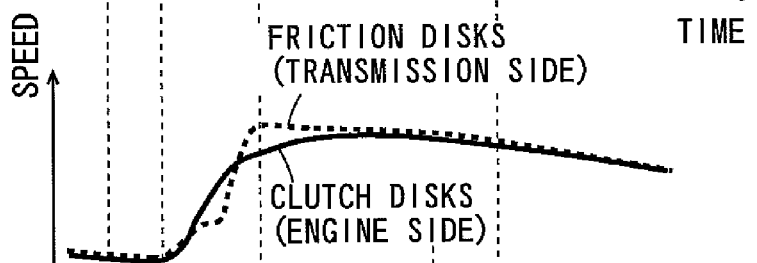
Figure 7C:
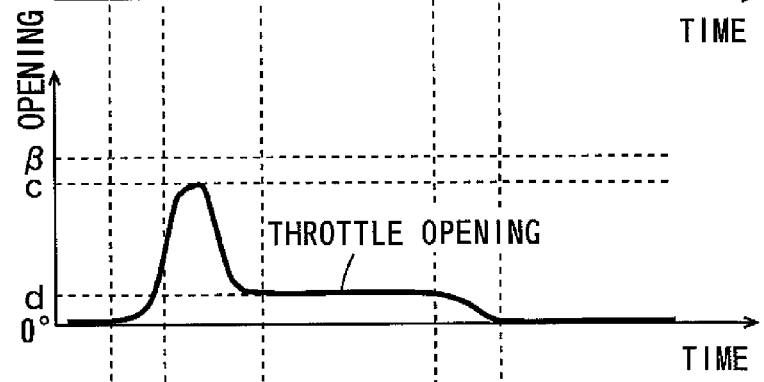
Figure 7D:
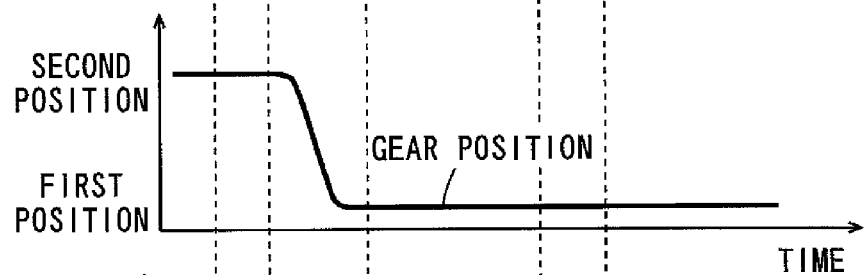
Figure 7E:
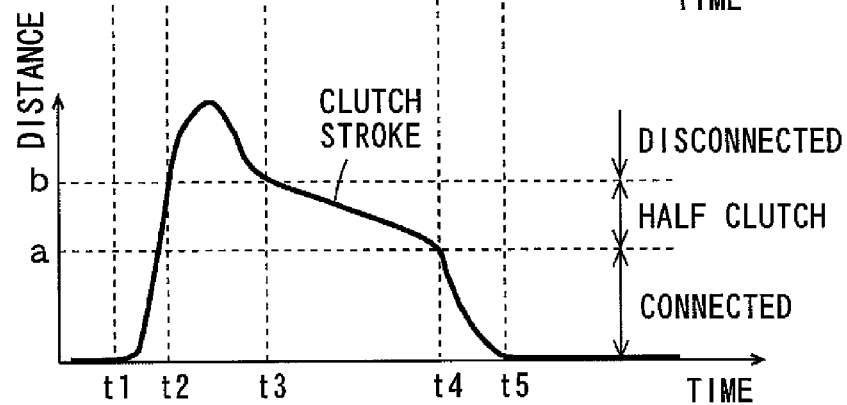

FIGS. 7A-7E are diagrams for explaining the down-shifting control according to the present preferred embodiment. FIG. 7A is a graph showing change of a vehicle speed with time, and FIG. 7B is a graph showing change of the rotational speeds of the clutch disks 3b and the friction disks 3c with time. FIG. 7C is a graph showing change of the throttle opening with time, FIG. 7D is a graph showing change of the gear position of the transmission 5 with time, and FIG. 7E is a graph showing change of a movement amount of the push rod 5e (FIG. 4) (hereinafter referred to as a clutch stroke) with time.

Note that in the graph of FIG. 7E, the clutch 3 is in the transmission state when the clutch stroke is not more than a value b, and the clutch 3 is in the disconnection state when the clutch stroke is not less than the value b. The clutch 3 is in a half clutch state when the clutch stroke is larger than a value a and smaller than the value b.

Note that description is made of a case where the gear position of the transmission 5 is shifted down from the second position to the first position during deceleration of the motorcycle 100 with reference to FIGS. 7A-7E.

As shown in FIG. 7E, the clutch stroke is increased by the control of the ECU 50 after the driver has performed the down-shifting operation at a time point t1 in the down-shifting control according to the present preferred embodiment. Thus, the clutch 3 is brought into the disconnection state at a time point t2. In addition, the throttle opening is temporarily increased to a preset angle c by the control of the ECU 50 as shown in FIG. 7C. This reduces the engaging force between the transmission gears 5c and the transmission gears 5d, causing the transmission gears 5c or the transmission gears 5d to easily move.

Note that the throttle valves 82 are adjusted such that the torque of the engine 107 is not more than the running resistance until the clutch 3 is brought into the disconnection state at the time point t2 in the present preferred embodiment. The running resistance means resistance determined by air resistance, rolling resistance, incline resistance, acceleration resistance and so on, for example, acting on the motorcycle 100. When the torque generated in the engine 107 is not more than the running resistance, the motorcycle 100 is not accelerated even though the clutch 3 is in the transmission state. Therefore, the throttle valves 82 are adjusted such that the torque of the engine 107 is not more than the running resistance until the time point t2 at which the clutch 3 is brought into the disconnection state, so that the motorcycle 100 can be prevented from being accelerated after the down-shifting operation by the driver.

In addition, the angle c of FIG. 7C is preset based on an allowable maximum rotational speed of the engine 107 (an upper limit of the rotational speed preset for sufficiently ensuring reliability of the engine). Specifically, when the output of the engine 107 is increased with the clutch 3 being disconnected (no load state), the angle c is determined such that the rotational speed of the engine 107 is maintained to be not more than the allowable maximum rotational speed, for example. In this case, the rotational speed of the engine 107 can be prevented from being faster than the allowable maximum rotational speed even though the throttle opening is increased to the angle c when the clutch 3 is in the disconnection state after the time point t2. This sufficiently ensures the reliability of the engine 107.

Note that a maximum throttle opening with which the rotational speed of the engine 107 can be maintained to be not more than the allowable maximum rotational speed in the no load state is set as the angle c in the present preferred embodiment. In this case, the rotational speed of the engine 107 is smoothly increased and the reliability of the engine 107 is sufficiently ensured.

In the present preferred embodiment, the angle c is set such that the engaging portion 864 (FIGS. 3A and 3B) and the engaging portion 891 (FIGS. 3A and 3B) do not come in contact with each other when the throttle opening is increased to the angle c with the opening of the accelerator grip 106 (FIG. 1) being set to the minimum value. Specifically, when an overshoot amount (an amount of exceeding a target value) of the throttle valves 82 at the time of increasing the throttle opening to the angle c is 2°, for example, the angle c is set smaller than the angle β (FIGS. 3A and 3B) by about 5°, for example. In this case, the engaging portion 864 and the engaging portion 891 can be reliably prevented from coming in contact with each other even though overshoot of the throttle valves 82 occurs. This prevents the accelerator grip 106 from being moved by a motor to give the rider uncomfortable feeling. In the present preferred embodiment, the allowable maximum rotational speed is preferably set to about 9000 rpm, the angle c is preferably set to about 25°, and the angle β is preferably set to about 30°, for example.

Then, the gear position of the transmission 5 is switched from the second position to the first position by the control of the ECU 50 after the time point t2 at which the clutch 3 is disconnected as shown in FIGS. 7D and 7E. Then, the clutch stroke is decreased, and the clutch 3 enters the transmission state at a time point t3.

Here, the gear position of the transmission 5 is moved to the lower position by one stage in a time period between the time point t2 and the time point t3, so that the reduction gear ratio between the main shaft 5*a* and the drive shaft 5*b* is increased in the present preferred embodiment. This increases the rotational speed of the main shaft 5*a* to increase the rotational speed of the friction disks 3*c* (FIG. 4) as shown in FIG. 7B.

Moreover, the throttle opening is increased in the time period between the time point t2 and the time point t3, thereby increasing the rotational speed of the engine 107. Accordingly, the rotational speed of the clutch disks 3*b* (FIG. 4) is increased as shown in FIG. 7B.

The time period during which the clutch 3 is in the disconnection state (time period from the time point t2 to the time point t3) is set to not more than about 90 msec, for example, in order to shorten an idle running time period in the present preferred embodiment. As described above, an upper limit of the throttle opening is restricted to the angle c in the time period between the time point t2 and the time point t3. Even though the opening of the throttle valve is restricted, the output of the engine can be sufficiently increased by increasing the opening of the throttle for a long time period in a range of restriction. In this case, however, the opening of the throttle valve 82 cannot be maintained at the angle c for a sufficient time period. Therefore, the throttle opening is adjusted to an angle d (d>0) before the time point t3 at which the clutch 3 is switched from the disconnection state to the transmission state. This prevents transmission of a large torque from the engine 107 to the main shaft 5*a* at the time point t3 even though the idle running time period is set short. That is, occurrence of the shift shock at the time of switching the clutch 3 from the disconnection state to the transmission state can be prevented even though the idle running time period is set short.

Therefore, the rotational speed of the engine 107 is not significantly increased in the time period during which the clutch 3 is in the disconnection state in the present preferred embodiment. Accordingly, the rotational speed of the clutch disks 3*b* is lower than the rotational speed of the friction disks 3*c* at the time point t3 at which the clutch 3 is switched from the disconnection state to the transmission state as shown in FIG. 7B.

A difference of the rotational speed between the clutch disks 3*b* and the friction disks 3*c* is decreased by maintaining the half clutch state for a predetermined time period. Specifically, after the clutch 3 is switched from the disconnection state to the transmission state at the time point t3, the clutch stroke is decreased at approximately a constant ratio until attaining the value a with which the half clutch state is finished as shown in FIG. 7E. This gradually decreases the difference of the rotational speed between the clutch disks 3*b* and the friction disks 3*c*.

Thereafter, the ratio of decrease of the clutch stroke is increased at a time point t4 at which the clutch stroke attains the value a, and the throttle opening is decreased from the angle d to 0°. Then, the clutch stroke is set to a minimum value at a time point t5, so that the down-shifting of the transmission 5 is completed.

Here, the throttle valves 82 are not fully closed, but the throttle opening is adjusted to the angle d at the time point t3 as shown in FIG. 7C in the present preferred embodiment. Hereinafter, detail description is made of effects of the down-shifting control according to the present preferred embodiment while comparing the down-shifting control according to the present preferred embodiment with the down-shifting control in a case where the opening of the throttle valves 82 is set to the minimum value when the clutch 3 is switched from the disconnection state to the transmission state.

Figure 8A:
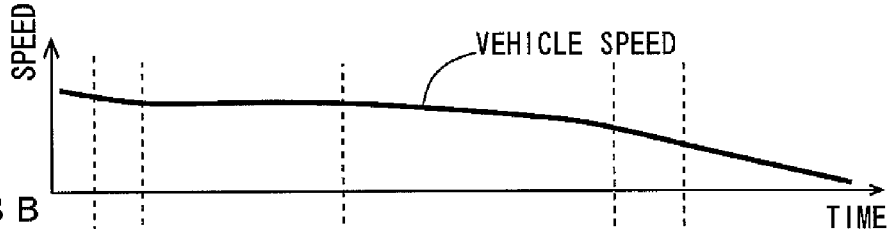
FIGS. 8A-8E are diagrams showing a state of each component when throttle valves are fully closed at the time of connection of a clutch.
Figure 8B:
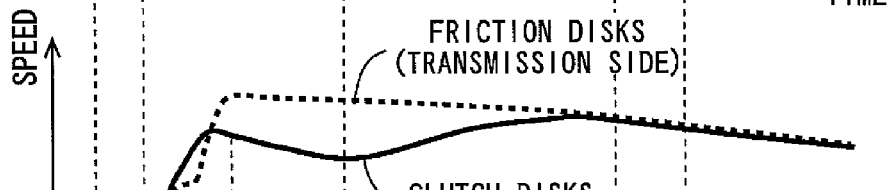
Figure 8C:
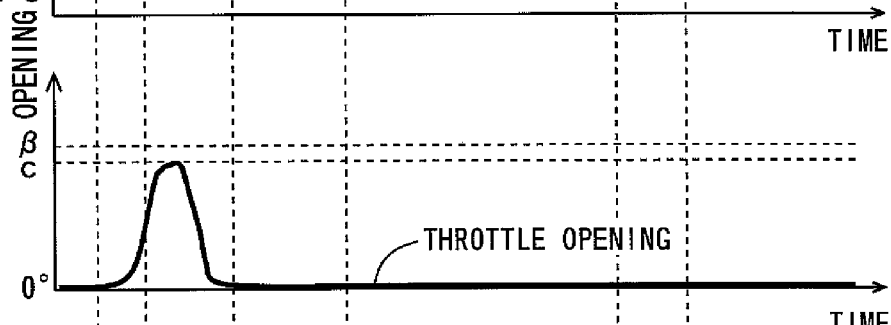
Figure 8D:
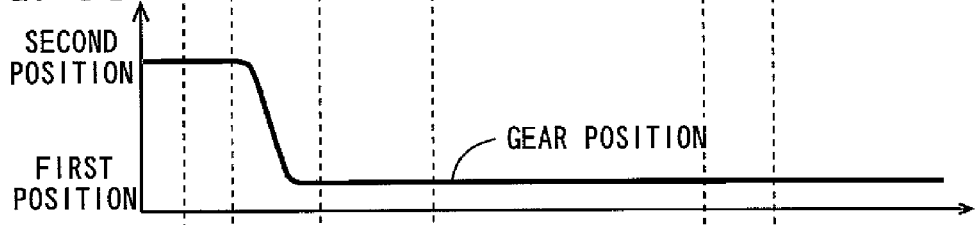
Figure 8E:
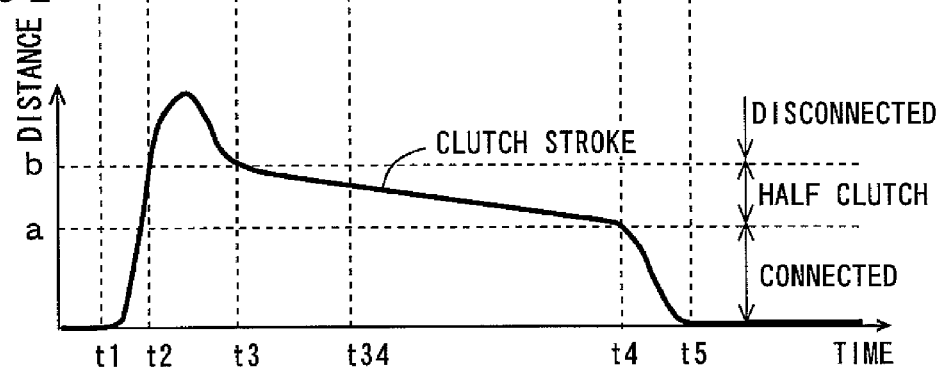

FIGS. 8A-8E are diagrams showing a state of each component when the opening of the throttle valves 82 is set to the minimum value at the time of switching the clutch 3 from the disconnection state to the transmission state. Note that FIG. 8A is a graph showing change of the vehicle speed with time, and FIG. 8B is a graph showing change of the rotational speeds of the clutch disks 3*b* and the friction disks 3*c* with time. Moreover, FIG. 8C is a graph showing change of the throttle opening with time, FIG. 8D is a graph showing change of the gear position of the transmission 5 with time, and FIG. 8E is a graph showing change of the clutch stroke with time.

As shown in FIGS. 8B, 8C, and 8E, when the opening of the throttle valves 82 is set to the minimum value at the time point t3, the output of the engine 107 is excessively decreased at the time of switching the clutch 3 from the disconnection state to the transmission state, thereby decreasing the rotational speed of the clutch disks 3*b*. Accordingly, the speed of the clutch disks 3*b* is not increased until a time point t34 between the time point t3 and the time point t4 even though the clutch 3 enters the half clutch state as shown in FIG. 8B and FIG. 8E. Since the decrease in the speed of the clutch disks 3*b* increases the difference of the rotational speed between the clutch disks 3*b* and the friction disks 3*c*, an engine brake hardly acts on the motorcycle 100. That is, in the example of FIGS. 8A-8E in which the opening of the throttle valves 82 is set to the minimum value at the time of switching the clutch 3 from the disconnection state to the transmission state, the engine brake hardly acts on the motorcycle 100 in a time period from the time point t3 to the time point t34.

As described above, when the throttle valves 82 are fully closed at the time of switching the clutch 3 from the disconnection state to the transmission state, the engine brake does not act on the motorcycle 100 even though the clutch 3 enters the half clutch state, resulting in the longer idle running time period. This degrades a driving feeling of the motorcycle 100.

In addition, the difference of the rotational speed between the clutch disks 3*b* and the friction disks 3*c* is increased at the time of switching the clutch 3 from the disconnection state to the transmission state as shown in FIG. 8B. In this case, the half clutch state has to be maintained for long in order to decrease the difference of the rotational speed between the clutch disks 3*b* and the friction disks 3*c* and to prevent occurrence of the shift shock. This causes a longer time period required for the down-shifting control. This is because if the clutch 3 is connected in a short period of time, a problem arises that an excessive engine brake force is produced. Specifically, a time period from the time point t1 at which the driver performs the shifting operation to the time point t5 at which the down-shifting control is finished is about 800 msec in the example of FIGS. 8A-8E.

Meanwhile, in the present preferred embodiment, the throttle opening is adjusted to the angle d (>0) at the time point t3 at which the clutch 3 is switched from the disconnection state to the transmission state, thus preventing the excessive decrease in the output of the engine 107 at the time of switching the clutch 3 from the disconnection state to the transmission state as shown in FIGS. 7C and 7E. In this case, the rotational speed of the clutch disks 3b is not decreased at the time of switching the clutch 3 from the disconnection state to the transmission state, so that the rotational speed of the clutch disks 3b can be smoothly increased as shown in FIG. 7B. That is, the down-shifting control according to the present preferred embodiment can cause the half clutch time period of the motorcycle 100 to be shorter. The down-shifting control also can cause the engine brake corresponding to a gear stage to act on the motorcycle 100 at the time point t3 at which the clutch 3 is switched from the disconnection state to the transmission state.

In this manner, the throttle opening is adjusted to the angle d at the time of switching the clutch 3 from the disconnection state to the transmission state in the down-shifting control according to the present preferred embodiment, thereby increasing the rotational speed of the engine without causing the engine brake to rapidly act on the motorcycle 100. This shortens the half clutch time period and improves the driving feeling of the motorcycle 100.

Moreover, the throttle opening is adjusted to the angle d in the time period during which the clutch 3 is in the half clutch state (time period from the time point t3 to the time point t4) as shown in FIGS. 7C and 7E in the present preferred embodiment. In this case, the excessive decrease in the rotational speed of the clutch disks 3b during the connection of the clutch 3 is prevented, thus allowing the rotational speed of the clutch disks 3b and the rotational speed of the friction disks 3c to coincide with each other in a short time period. This allows for the quick connection of the clutch 3 without occurrence of the shift shock in the motorcycle 100, resulting in the shorter time period required for the down-shifting control. Specifically, a time period from the time point t1 to the time point t4 is about 220 msec to about 470 msec in the example of FIGS. 7A-7E.

Note that in FIGS. 7A-7E, a time period from the time point t1 to the time point t3 is about 90 msec to about 120 msec, for example, a time period from the time point t2 to the time point t3 is about 60 msec to about 90 msec, for example, and a time period from the time point t4 to the time point t5 is about 60 msec, for example. A time period required for decreasing the throttle opening from the angle c to the angle d is about 40 msec, for example.

The time point at which the throttle opening is adjusted to the angle c and the time point t3 at which the connection of the clutch 3 is started are determined by the ECU 50 based on the rotational speed of the engine 107, the gear position of the transmission 5 and so on. Specifically, a relationship among the time point at which the throttle opening is adjusted to the angle c, the time point t3 at which the connection of the clutch 3 is started, the rotational speed of the engine 107, the gear position of the transmission 5 and so on is stored in advance in the ROM or the RAM of the ECU 50, for example. Then, the ECU 50 determines the time point at which the throttle opening is adjusted to the angle c and the time point t3 at which the connection of the clutch 3 is started based on the relationship.

The angle d of FIG. 7C is a value determined based on the rotational speed of the engine 107 after the gear change calculated by the ECU 50 when the down-shifting operation is performed by the driver. The rotational speed of the engine 107 after the gear change is a rotational speed of the engine 107 with which the rotational speed (vehicle speed) of the drive shaft 5b (FIG. 4) before the gear change can be maintained in the gear position after the gear change.

Specifically, the rotational speed of the engine 107 after the gear change is calculated by the ECU 50 based on the following equation (1). Note that S1 represents the rotational speed of the engine 107 when the driver performs the shifting operation using the shift pedal 112, S2 represents the rotational speed of the engine 107 after the gear change, R1 represents the reduction gear ratio of the transmission 5 before the gear change, and R2 represents the reduction gear ratio of the transmission 5 after the gear change in the following equation (1).

$$S2 = S1 \times (R2/R1) \tag{1}$$

The angle d of FIG. 7C is a throttle opening with which the torque generated by the engine 107 is zero in the rotational speed of the engine 107 after the gear change calculated by the foregoing equation. Detail description will be made of a method of calculating the angle d. Note that the throttle opening with which the torque generated by the engine 107 is zero is referred to as a zero torque opening in the following description.

In the present preferred embodiment, a relationship between the zero torque opening obtained by experiments, simulations and so on and the rotational speed of the engine 107 is stored in advance in the ROM or the RAM of the ECU 50. Then, the ECU 50 calculates the zero torque opening based on the relationship stored in the ROM (or the RAM) and the rotational speed of the engine 107 calculated by the foregoing equation (1). Note that the relationship between the zero torque opening and the rotational speed of the engine 107 may be stored as an equation or a map, for example.

Figure 9:
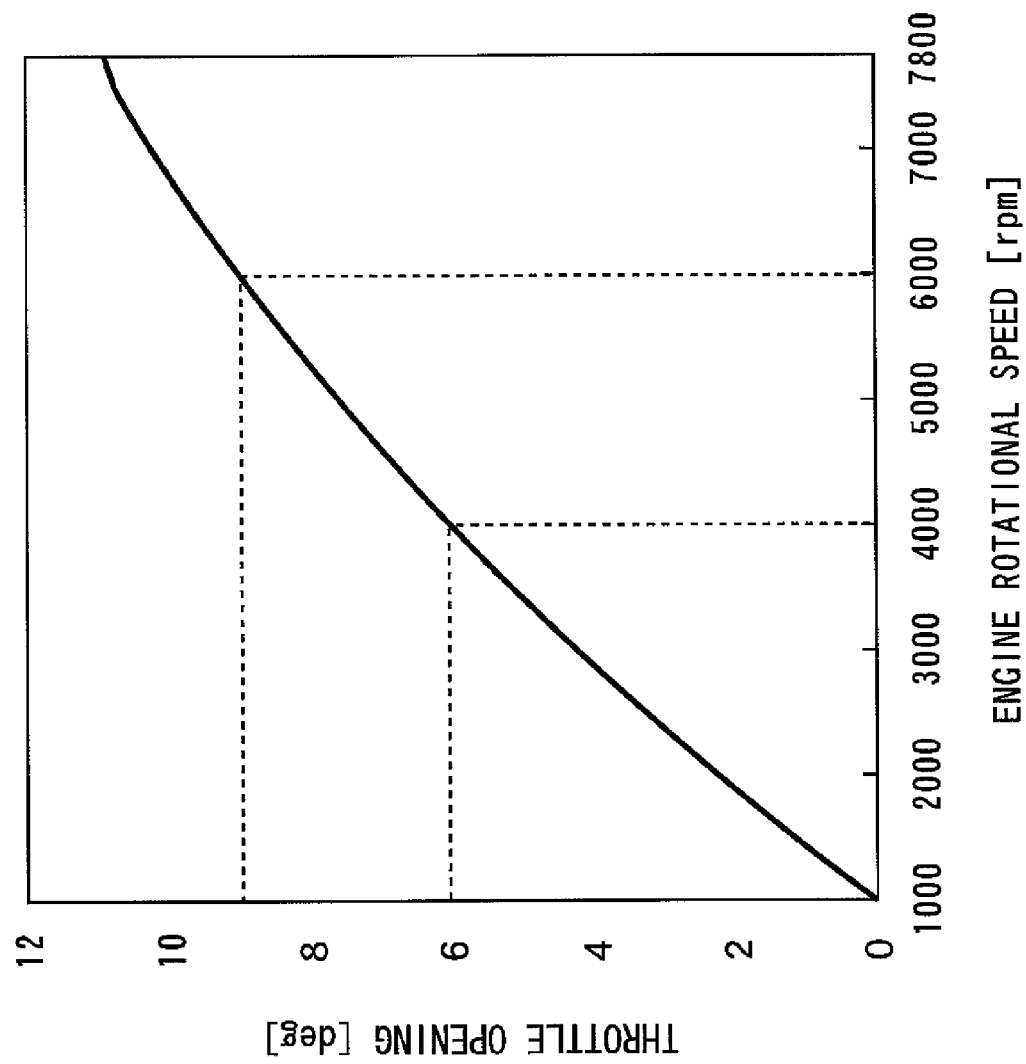
FIG. 9 is a diagram showing an example of a relationship between a zero torque opening and a rotational speed of an engine.

FIG. 9 is a diagram showing an example of the relationship between the zero torque opening and the rotational speed of the engine 107. The ordinate indicates the throttle opening and the abscissa indicates the rotational speed of the engine 107 in FIG. 9.

In the example shown in FIG. 9, the zero torque opening is about 6° when the rotational speed of the engine 107 is approximately 4000 rpm, for example. Therefore, when the rotational speed of the engine 107 after the gear change calculated by the ECU 50 is approximately 4000 rpm, the angle d of FIG. 7C is set to about 6°, for example.

In the example of FIG. 9, the zero torque opening is about 9° when the rotational speed of the engine 107 is approximately 6000 rpm, for example. Therefore, when the rotational speed of the engine 107 after the gear change calculated by the ECU 50 is approximately 6000 rpm, the angle d of FIG. 7C is set to about 9°, for example.

As described above, the zero torque opening is calculated based on the rotational speed of the engine 107 after the gear change calculated by the foregoing equation (1) in the present preferred embodiment. Then, the ECU 50 controls the throttle opening to be adjusted to the zero torque opening (the angle d) at the time point t3 at which the clutch 3 is switched from the disconnection state to the transmission state.

In this case, the large torque is prevented from being generated in the engine 107 at the time of switching the clutch 3 from the disconnection state to the transmission state. This prevents transmission of the large torque from the engine 107 to the main shaft 5a at the time of switching the clutch 3 from the disconnection state to the transmission state. This results in prevention of acceleration of the motorcycle 100 at the time of switching the clutch 3 from the disconnection state to the transmission state, thus preventing occurrence of the shift shock.

It is preferred that the throttle opening does not attain an angle smaller than the angle d at the time of decreasing the throttle opening from the angle c to the angle d as shown in FIG. 7C. This sufficiently prevents the excessive decrease in the rotational speed of the engine 107 at the time of the connection of the clutch 3. As a result, the down-shifting of the transmission 5 can be more smoothly performed.

(b) Control Flow

Next, description is made of operation of the ECU 50 in the down-shifting control according to the present preferred embodiment.

Figure 10:
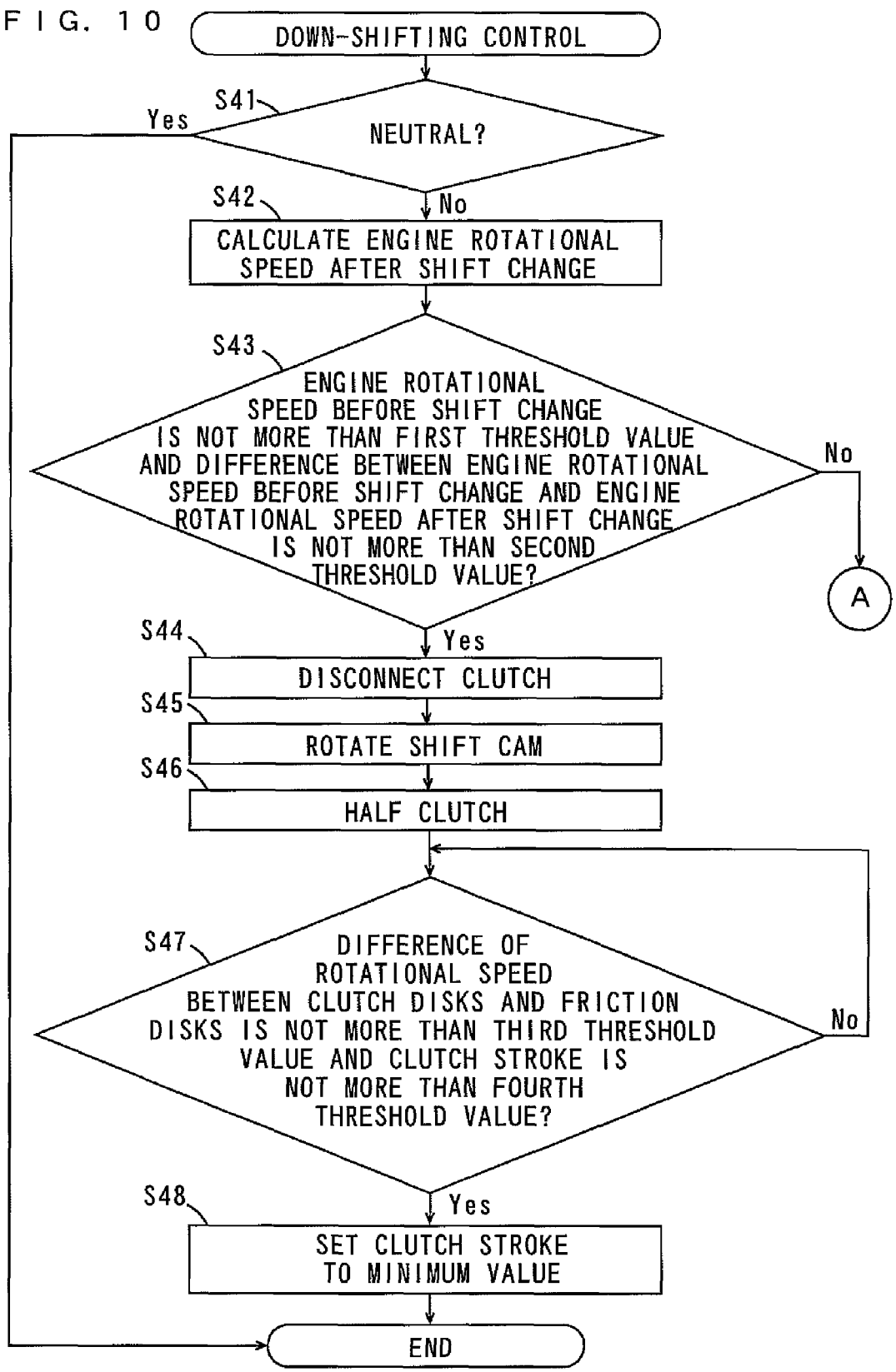
FIG. 10 is a flowchart showing details of the down-shifting control.
Figure 11:
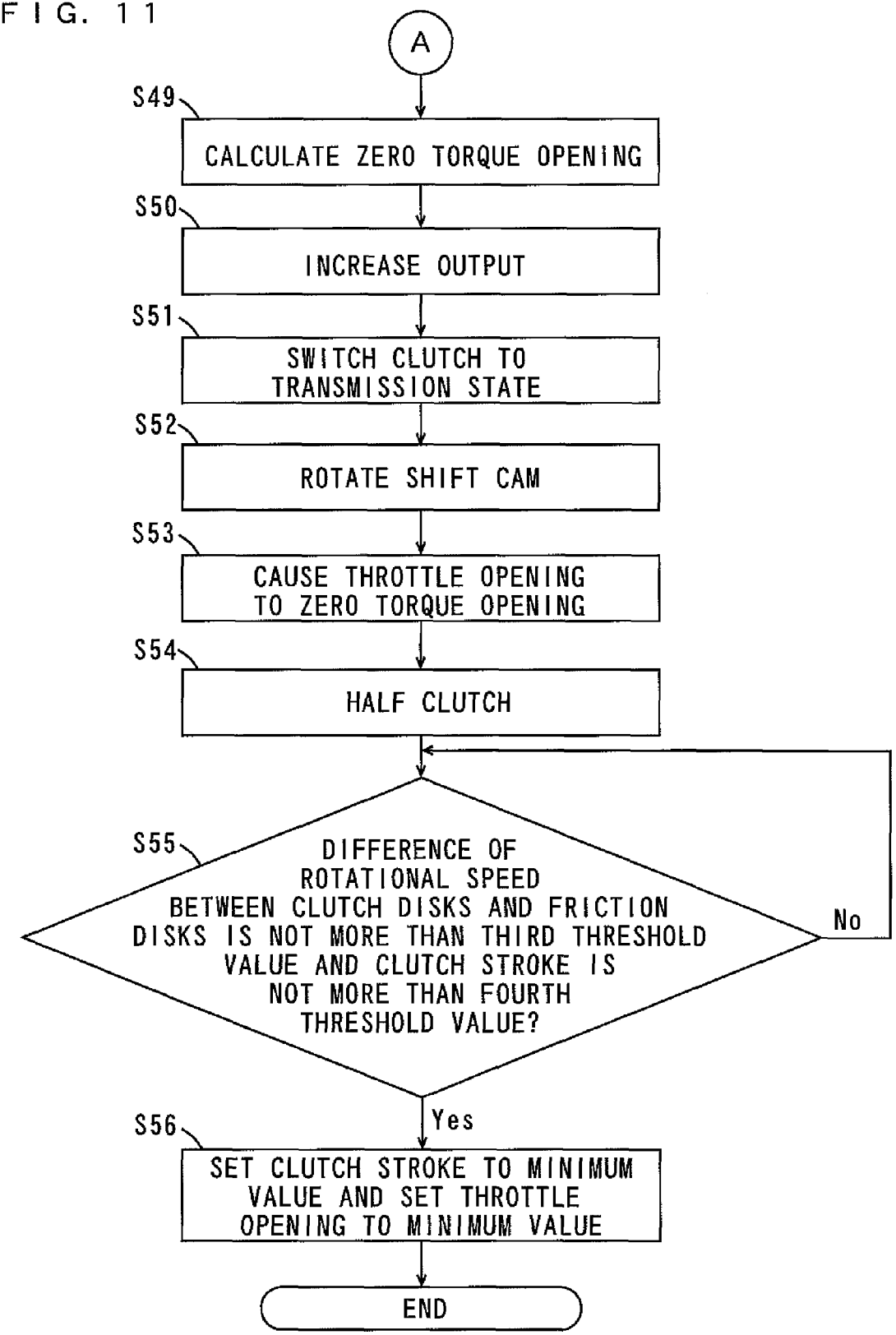
FIG. 11 is a flowchart showing the details of the down-shifting control.

FIGS. 10 and 11 are flowcharts showing details of the down-shifting control in Step S2 of FIG. 6.

As shown in FIG. 10, first, the ECU 50 determines whether the gear position of the transmission 5 (FIG. 4) is neutral based on the value detected by the shift cam rotation angle sensor SE4 (FIG. 5) in the down-shifting control (step S41). When the gear position of the transmission 5 is not neutral, the ECU 50 calculates the rotational speed of the engine 107 after the down-shifting based on the value detected by the engine rotational speed sensor SE3 (FIG. 5), the value detected by the shift cam rotation angle sensor SE4 and the foregoing equation (1) (Step S42).

Next, the ECU 50 determines whether the rotational speed of the engine 107 before the down-shifting is not more than a first threshold value (about 2700 rpm, for example) based on the value detected by the engine rotational speed sensor SE3 and determines whether a difference between the rotational speed of the engine 107 before the down-shifting and the rotational speed of the engine 107 after the down-shifting calculated in Step S42 is not more than a second threshold value (about 400 rpm, for example) (Step S43). Note that the first and second threshold values as well as third and fourth threshold values, described below, are stored in advance in the ROM (or the RAM) of the ECU 50.

When the rotational speed of the engine 107 is not more than the first threshold value and the difference between the rotational speed of the engine 107 before the down-shifting and the rotational speed of the engine 107 after the down-shifting is not more than the second threshold value, the ECU 50 determines that the down-shifting can be smoothly performed with no output increase of the engine 107. Then, the ECU 50 controls the clutch actuator 4 (FIG. 4) to disconnect the clutch 3 (FIG. 4) without opening the throttle valves 82 (Step S44).

Then, the ECU 50 controls the shift actuator 7 (FIG. 4) to rotate the shift cam 6a (FIG. 4) with the clutch 3 being disconnected (Step S45). Thus, the shift forks 6c (FIG. 4) move, causing the transmission gears 5c, 5d (FIG. 4) to move. As a result, the gear position of the transmission 5 moves to the lower position by one stage. The ECU subsequently controls the clutch actuator 4 (FIG. 4) to bring the clutch 3 (FIG. 4) into the half clutch state by (Step S46). This gradually decreases the difference of the rotational speed between the clutch disks 3b and the friction disks 3c.

Then, the ECU 50 determines whether the difference of the rotational speed between the clutch disks 3b and the friction disks 3c is not more than the third threshold value (about 200 rpm, for example) and the clutch stroke is not more than the fourth threshold value (the value a of FIGS. 7A-7E, for example) (Step S47). Note that the rotational speed of the clutch disks 3b is calculated based on the rotational speed of the engine 107 detected by the engine rotational speed sensor SE3 and a first reduction gear ratio between the crank 2 and the clutch 3. The rotational speed of the friction disks 3c is calculated based on the rotational speed of the drive shaft 5b detected by the drive shaft rotational speed sensor SE5 and the reduction gear ratio of the transmission 5. The clutch stroke may be calculated from a control amount applied from the ECU 50 to the clutch actuator 4 (FIG. 4), or calculated by providing a detection sensor that detects the movement amount of the push rod 5e (FIG. 4), for example.

When the difference of the rotational speed between the clutch disks 3b and the friction disks 3c is larger than the third threshold value or the clutch stroke is larger than the fourth threshold value, the ECU 50 keeps the half clutch state until the difference of the rotational speed between the clutch disks 3b and the friction disks 3c is not more than the third threshold value and the clutch stroke is not more than the fourth threshold value.

When the difference of the rotational speed between the clutch disks 3b and the friction disks 3c is not more than the third threshold value and the clutch stroke is not more than the fourth threshold value in Step S47, the ECU 50 controls the clutch actuator 4 to set the clutch stroke to the minimum value (Step S48). Accordingly, the down-shifting control is finished.

When it is determined that the gear position of the transmission 5 is neutral in Step S41, the ECU 50 does not execute the processes of Steps S42 to S48 and finishes the up-shifting control.

When it is determined that the rotational speed of the engine 107 is larger than the first threshold value or the difference between the rotational speed of the engine 107 before the down-shifting and the rotational speed of the engine 107 after the down-shifting is larger than the second threshold value in Step S43, the ECU 50 performs the down-shifting control described with reference to FIGS. 7A-7E.

Specifically, the ECU 50 calculates the zero torque opening (the angle d in FIG. 7C) based on the rotational speed of the engine 107 after the down-shifting calculated in Step S42 as shown in FIG. 11 (Step S49).

Next, the ECU 50 controls the throttle actuator 85 (FIG. 2) to temporarily increase the output of the engine 107 (FIG. 1) (Step S50). In the example of FIG. 7C, the throttle opening is adjusted to the angle c.

The ECU 50 subsequently controls the clutch actuator 4 to switch the clutch 3 from the disconnection state to the transmission state (Step S51). Then, the ECU 50 controls the shift actuator 7 to rotate the shift cam 6a with the clutch 3 being disconnected (Step S52). Thus, the shift forks 6c are moved to cause the transmission gears 5c, 5d to be moved. As a result, the gear position of the transmission 5 moves to the lower position by one stage.

The ECU 50 then controls the throttle actuator 85 to cause the throttle opening to be adjusted to the zero torque opening calculated in Step S49 (Step S53). The ECU 50 subsequently controls the clutch actuator 4 to bring the clutch 3 into the half clutch state (Step S54). This gradually decreases the difference of the rotational speed between the clutch disks 3b and the pressure plate 3a.

Next, the ECU 50 determines whether the difference of the rotational speed between the clutch disks 3b and the friction disks 3c is not more than the third threshold value and the clutch stroke is not more than the fourth threshold value (Step S55). When the difference of the rotational speed between the clutch disks 3b and the friction disks 3c is larger than the third threshold value or the clutch stroke is larger than the fourth threshold value, the ECU 50 keeps the half clutch state.

When the difference of the rotational speed between the clutch disks 3b and the friction disks 3c is not more than the third threshold value and the clutch stroke is not more than the fourth threshold value in Step S55, the ECU 50 determines that the clutch 3 can be connected without occurrence of the shock in the motorcycle 100. Accordingly, the ECU 50 controls the clutch actuator 4 to set the clutch stroke to the minimum value and controls the throttle actuator 85 to set the throttle opening to the minimum value (Step S56). Accordingly, the down-shifting control is finished.

Note that the fourth threshold value is preferably set to not more than the minimum clutch stroke with which the clutch 3 is in the half clutch state. Thus, the fourth threshold value is preferably set to not more than the value a in FIG. 7E. In this case, the throttle opening is adjusted to the angle d at least when the clutch 3 is in the half clutch state. Accordingly, the decrease in the rotational speed of the engine 107 before complete connection of the clutch 3 can be prevented. This prevents occurrence of the shock in the motorcycle 100 at the time of the connection of the clutch 3.

(5) Effects and Advantages of the Present Preferred Embodiment

In the present preferred embodiment, the throttle opening is adjusted to the zero torque opening (the angle d in FIG. 7B) without fully closing the throttle valves 82 when the connection of the clutch 3 is started. This prevents the output decrease in the engine 107 at the time of the connection of the clutch 3, thus allowing the smooth increase in the rotational speed of the clutch disks 3b. This results in the shorter idle running time period, improving the driving feeling of the motorcycle 100.

In addition, the throttle valves 82 are not fully closed, thus preventing the decrease in the rotational speed of the clutch disks 3b during the connection of the clutch 3. This allows the rotational speed of the clutch disks 3b and the rotational speed of the friction disks 3c to coincide with each other in the short time period. As a result, the quick down-shifting can be performed without occurrence of the shift shock in the motorcycle 100.

Moreover, the throttle opening is adjusted to the zero torque opening (the angle d) when the clutch 3 is switched from the disconnection state to the transmission state, thus preventing the occurrence of the large torque in the engine 107 at the time of switching the clutch 3 from the disconnection state to the transmission state in the present preferred embodiment. This prevents the acceleration of the motorcycle 100 at the time of switching the clutch 3 from the disconnection state to the transmission state. As a result, the occurrence of the shift shock can be prevented.

(6) Other Preferred Embodiments (a) Another Example of the Method of Calculating the Rotational Speed of the Engine after the Gear Change While the rotational speed of the engine 107 after the gear change is calculated by the ECU 50 as the rotational speed with which the rotational speed of the drive shaft 5b before the gear change can be maintained in the foregoing preferred embodiment, the method of calculating the rotational speed of the engine 107 is not limited to the above-described example.

For example, the rotational speed of the drive shaft 5b after the gear change may be calculated based on a change amount of the rotational speed of the drive shaft 5b in a predetermined time period before the gear change to calculate the rotational speed of the engine 107 with which the calculated rotational speed of the drive shaft 5b can be maintained. In this case, the rotational speed of the engine 107 after the gear change is calculated in consideration of change of the speed of the drive shaft 5b (the motorcycle 100), so that a more appropriate rotational speed of the engine 107 can be calculated. Accordingly, a more appropriate zero torque opening can be calculated.

(b) Another Example of the Throttle Opening at the Time of the Connection of the Clutch While the zero torque opening (the angle d of FIG. 7C) is calculated based on the rotational speed of the engine 107 after the gear change calculated by the ECU 50 in the foregoing preferred embodiment, the method of calculating the zero torque opening is not limited to the above-described example.

For example, the zero torque opening may be calculated based on the rotational speed of the engine 107 after the gear change detected by the engine rotational speed sensor SE3. In this case, the zero torque opening may be a constant value calculated based on the rotational speed of the engine 107 at a predetermined time point (the time point t3 of FIGS. 7A-7E, for example) after the gear change, or may be a value that changes according to the change of the rotational speed of the engine 107 in the half clutch time period (the time period from the time point t3 to the time point t4 of FIGS. 7A-7E), for example.

While the throttle opening is adjusted to the zero torque opening calculated by the ECU 50 at the time of connecting the clutch 3 and during the half clutch state of the clutch 3 in the foregoing preferred embodiment, the throttle opening may not be adjusted to the zero torque opening.

For example, the throttle opening may be adjusted such that the torque generated in the engine 107 is not less than zero and not more than the running resistance at the time of connecting the clutch 3 and during the half clutch state of the clutch 3. As described above, when the torque generated in the engine 107 is not more than the running resistance, the connection of the clutch 3 does not cause the motorcycle 100 to be accelerated. Accordingly, the driving feeling of the motorcycle can be prevented from being degraded at the time of the connection of the clutch 3.

Figure 12:
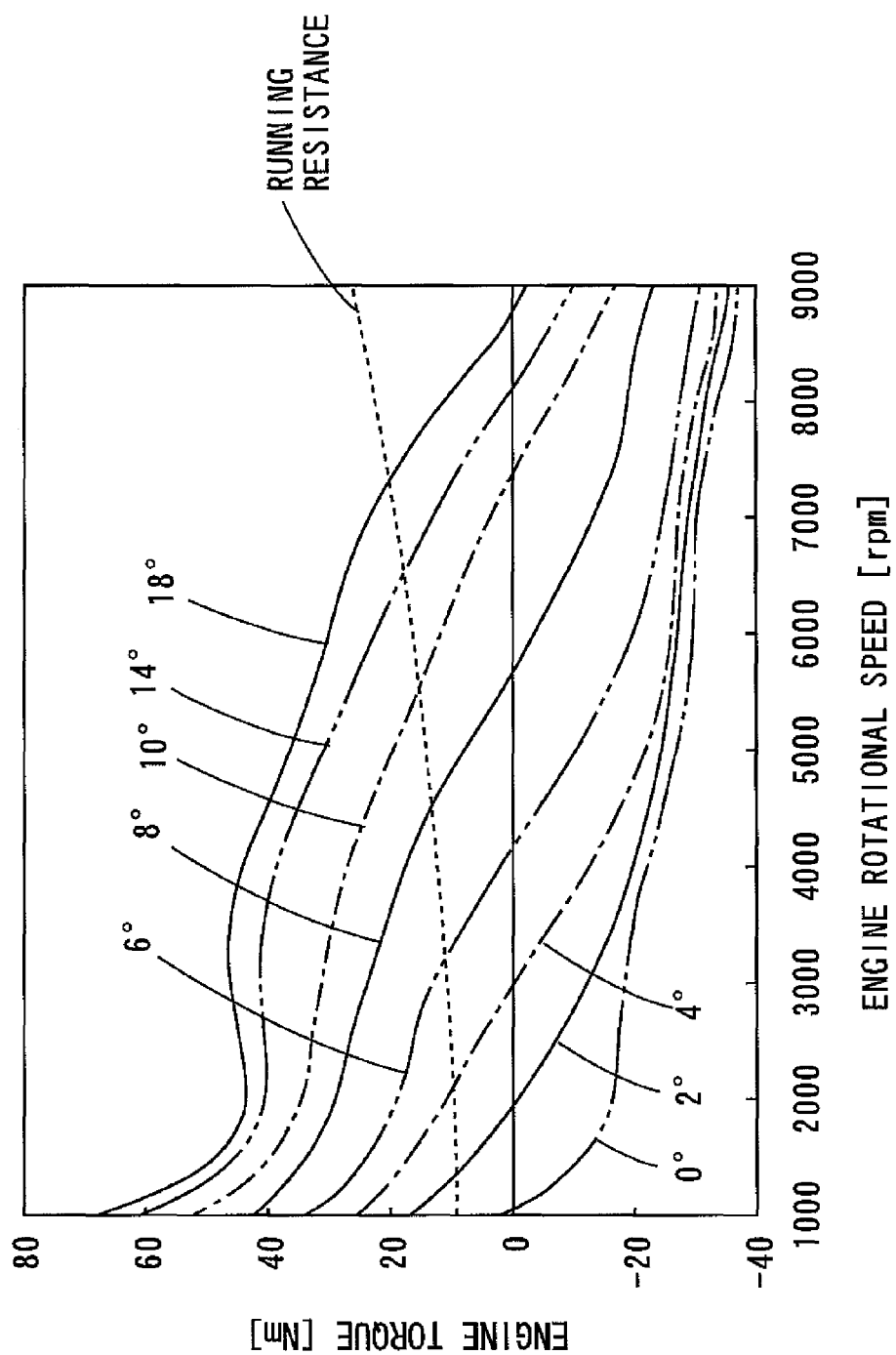
FIG. 12 is a diagram showing a relationship between a throttle opening and running resistance.

FIG. 12 is a diagram showing a relationship between the throttle opening and the running resistance. Note that the ordinate indicates the torque generated in the engine 107, and the abscissa indicates the rotational speed of the engine 107 in FIG. 12.

In addition, FIG. 12 shows relationships between the rotational speed and the torque of the engine 107 when the throttle opening is 0°, 2°, 4°, 6°, 8°, 10°, 14° and 18°, and the running resistance when the motorcycle 100 is driven at the second position on a flat ground.

In the example of FIG. 12, when the rotational speed of the engine 107 is about 5000 rpm, for example, the throttle opening of about 8° causes the torque of the engine 107 to be not less than zero and not more than the running resistance. When the rotational speed of the engine 107 is about 7000 rpm, for example, the throttle opening in a range from about 10° to about 14° causes the torque of the engine 107 to be not less than zero and not more than the running resistance.

Note that the running resistance on each gear position is stored in advance in the ROM (or the RAM) of the ECU 50 as a map or an equation. Similarly, the relationship among the throttle opening, the rotational speed of the engine 107 and the torque of the engine 107 is also stored in advance in the ROM (or the RAM) of the ECU 50. Then, the ECU 50 determines the throttle opening based on the relationships stored in the ROM (or the RAM), the value detected by the engine rotational speed sensor SE3 and the value detected by the shift cam rotation angle sensor SE4.

(c) Another Example of the Motorcycle

While the shift pedal 112 is preferably provided for the driver to perform the shifting operation in the foregoing preferred embodiment, a shift switch to detect the shifting operation by the driver may be provided at the handle 105. In this case, the driver can easily perform the shift change of the transmission by operating the shift switch.

While the throttle body 108 preferably having the four airflow paths 81 is described in the foregoing preferred embodiment, the number of the air flow paths 81 is not limited to four. The number of the air flow paths 81 is preferably changed according to the number of cylinders of the engine 107. For example, when the throttle body 108 is attached to the engine 107 with three cylinders, three air flow paths 81 are preferably provided in the throttle body 108. When the throttle body 108 is attached to the engine 107 with five cylinders, five airflow paths 81 are preferably provided in the throttle body 108.

While the motorcycle 100 is described as one example of the vehicle in the foregoing preferred embodiment, another vehicle such as a three-wheeled motor vehicle or a four-wheeled motor vehicle may be used.

(d) Another Example of the Transmission Control System

While description is made of the semi-automatic transmission control system 200 that performs the automatic shift change of the transmission 5 based on the shifting operation by the driver in the foregoing preferred embodiment, the present invention can be applied to a full automatic transmission control system.

In the full automatic transmission control system, a torque sensor that detects the torque of the engine 107 may be provided instead of the shifting operation detection sensor SE6, and the up-shifting control and the down-shifting control may be started based on the torque of the engine 107 detected by the torque sensor, for example.

While the clutch stroke and the fourth threshold value are preferably compared with each other in Step S47 (FIG. 10) and Step S55 (FIG. 11) in the foregoing preferred embodiment, a load acting on the push rod 5e and a preset threshold value may be compared with each other. In this case, the ECU 50 may determine that a connection amount of the clutch 3 is sufficiently increased when the load acting on the push rod 5e attains not less than the threshold value, and proceed to the process of Step S48 or Step S56.

In Step S47 and Step S55, the ECU 50 may proceed to the process of Step S48 and Step S56 when a state in which the difference of the rotational speed between the clutch disks 3b and the friction disks 3c is not more than the third threshold value continues for a preset time period (50 msec, for example) or more. In this case, the clutch 3 is connected while the rotational speeds of the clutch disks 3b and the friction disks 3c are stable, thus reliably preventing occurrence of the shift shock in the motorcycle 100.

(7) Correspondences between Elements in the Claims and Components in Preferred Embodiments In the following paragraph, non-limiting examples of correspondences between various elements recited in the claims below and those described above with respect to various preferred embodiments of the present invention are explained.

In the foregoing preferred embodiments, the throttle actuator 85 is an example of a throttle opening adjustment mechanism, the shifting operation detection sensor SE6 is an example of a detection device, the shift mechanism 6 and the shift actuator 7 are examples of a shift mechanism, the clutch actuator 4 is an example of a clutch actuation mechanism, the ECU 50 is an example of a controller, the clutch disk 3b is an example of a first rotation plate, the friction disk 3c is an example of a second rotation plate, the accelerator grip 106 is an example of an accelerator operator, the throttle shaft 83, the link mechanism 86, the rotation shaft 87, the pulley 88, the throttle cable 881 and the auxiliary arm 89 are examples of a coupling mechanism, the engaging portion 864 and the engaging portion 891 are examples of a restriction mechanism, and the rear wheel 116 is an example of a drive wheel.

The value c is an example of a first value, the value d is an example of a second value, zero is an example of a minimum value, the third threshold value is an example of a preset value, the fourth threshold value is an example of a predetermined value, and the angle $\beta$ is an example of a third value.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transmission control system comprising:
   a detection device arranged to detect a down-shifting operation;
   a throttle opening adjustment mechanism arranged to adjust an opening of a throttle valve;
   a shift mechanism arranged to change a gear position of a transmission;
   a clutch actuation mechanism arranged to switch a state of a clutch between a disconnection state and a transmission state; and
   a controller arranged to control the throttle opening adjustment mechanism, the shift mechanism, and the clutch actuation mechanism; wherein
   the controller is arranged to perform, after the detection device detects the down-shifting operation, a first control operation to increase the opening of the throttle valve to a first value by operation of the throttle opening adjustment mechanism and a second control operation to switch the clutch to the disconnection state by operation of the clutch actuation mechanism;
   the controller is arranged to perform, after the clutch is switched to the disconnection state, a third control operation to change the gear position of the transmission by operation of the shift mechanism and a fourth control operation to decrease the opening of the throttle valve to a second value that is smaller than the first value and larger than a minimum value by operation of the throttle opening adjustment mechanism;
   the controller is arranged to perform a fifth control operation to switch the clutch to the transmission state by operation of the clutch actuation mechanism after the opening of the throttle valve is decreased to the second value; and
   the controller is arranged to control the throttle opening adjustment mechanism such that the opening of the throttle valve is not smaller than the second value until a time point at which the fifth control operation switches the clutch from the disconnection state to the transmission state after a time point at which the fourth control operation causes the opening of the throttle valve to reach the second value.

2. The transmission control system according to claim 1, wherein the second value is set to such a value that a magnitude of a rear wheel driving force caused by a torque generated in an engine is not more than a magnitude of a running resistance of a vehicle.

3. The transmission control system according to claim 1, wherein the second value is set to such a value that a torque at which a rotational speed of an engine at the time of starting of the fifth control operation is maintained is generated.

4. The transmission control system according to claim 1, wherein the controller is arranged to control, when performing the first control operation, the opening of the throttle valve such that a magnitude of a rear wheel driving force caused by a torque generated in an engine is not more than a magnitude of a running resistance of a vehicle until the clutch is disconnected.

5. The transmission control system according to claim 1, wherein the clutch includes a first rotation plate arranged to be rotated by a torque generated by an engine, and a second rotation plate arranged to come in contact with the first rotation plate to transmit the torque generated by the engine to the transmission; and
the controller is arranged to control, after the clutch is set in the transmission state by the fifth control operation, the throttle opening adjustment mechanism such that the opening of the throttle valve is maintained at the second value until a difference of a rotational speed between the first rotation plate and the second rotation plate is not more than a preset value.

6. The transmission control system according to claim 1, wherein the clutch includes a first rotation plate arranged to be rotated by a torque generated by an engine, and a second rotation plate arranged to come in contact with the first rotation plate to transmit the torque generated by the engine to the transmission; and
the controller is arranged to start a connection of the clutch, and then bring the first and second rotation plates into close contact with each other by operation of the clutch actuation mechanism to completely connect the clutch when a state in which a difference of a rotational speed between the first rotation plate and the second rotation plate is smaller than a preset value continues for a preset time period or more.

7. The transmission control system according to claim 1, wherein the clutch includes a first rotation plate arranged to be rotated by a torque generated by an engine, and a second rotation plate arranged to come in contact with the first rotation plate to transmit the torque generated by the engine to the transmission; and
the controller is arranged to start connection of the clutch, and then set the opening of the throttle valve to the minimum value by operation of the throttle opening adjustment mechanism when a state in which a difference of a rotational speed between the first rotation plate and the second rotation plate is smaller than a preset value continues for a preset time period or more.

8. The transmission control system according to claim 1, wherein the clutch includes a first rotation plate arranged to be rotated by a torque generated by an engine, and a second rotation plate arranged to be in contact with and separated from the first rotation plate and come in contact with the first rotation plate to transmit the torque generated by the engine to the transmission;
the clutch actuation mechanism is arranged to switch the clutch between the disconnection state and the transmission state by adjusting a distance of the second rotation plate from the first rotation plate; and
the controller is arranged to control, after the clutch is set in the transmission state by the fifth control operation, the throttle opening adjustment mechanism such that the opening of the throttle valve is maintained at the second value until the distance of the second rotation plate from the first rotation plate is not more than a predetermined value.

9. The transmission control system according to claim 1, wherein the controller is arranged to adjust the opening of the throttle valve by operation of the throttle opening adjustment mechanism such that a magnitude of a rear wheel driving force caused by a torque generated in an engine is not more than a magnitude of a running resistance of a vehicle when the clutch is disconnected.

10. The transmission control system according to claim 1, wherein the controller is arranged to adjust the opening of the throttle valve by operation of the throttle opening adjustment mechanism based on an operation amount of an accelerator operator by the driver when shift change of the transmission is not performed;
the transmission control system is arranged to be operated in synchronization with the accelerator operator and further comprises a coupling mechanism that is mechanically coupled to the throttle valve; and
the throttle valve is arranged to be operated in synchronization with the coupling mechanism when not being driven by operation of the throttle opening adjustment mechanism.

11. The transmission control system according to claim 10, further comprising a restriction mechanism arranged to restrict, when the operation amount of the accelerator operator is zero, the opening of the throttle valve to a third value that is preset, wherein the second value is smaller than the third value.

12. A vehicle comprising:
a drive wheel;
an engine;
a throttle valve arranged to adjust an amount of air supplied to the engine;
a transmission arranged to transmit a torque generated by the engine to the drive wheel;
a clutch provided between the engine and the transmission; and
a transmission control system including:
a detection device arranged to detect a down-shifting operation;
a throttle opening adjustment mechanism arranged to adjust an opening of the throttle valve;
a shift mechanism arranged to change a gear position of the transmission;
a clutch actuation mechanism arranged to switch a state of the clutch between a disconnection state and a transmission state; and
a controller arranged to control the throttle opening adjustment mechanism, the shift mechanism, and the clutch actuation mechanism; wherein
the controller is arranged to perform, after the detection device detects the down-shifting operation, a first control operation to increase the opening of the throttle valve to a first value by operation of the throttle opening adjustment mechanism and second control to switch the clutch to the disconnection state by the clutch actuation mechanism;

the controller is arranged to perform, after the clutch is switched to the disconnection state, a third control operation to change the gear position of the transmission by the shift mechanism and a fourth control operation to decrease the opening of the throttle valve to a second value that is smaller than the first value and larger than a minimum value by operation of the throttle opening adjustment mechanism;

the controller is arranged to perform a fifth control operation to switch the clutch to the transmission state by operation of the clutch actuation mechanism after the opening of the throttle valve is decreased to the second value; and the controller is arranged to control the throttle opening adjustment mechanism such that the opening of the throttle valve is not smaller than the second value until a time point at which the fifth control operation switches the clutch from the disconnection state to the transmission state after a time point at which the fourth control operation causes the opening of the throttle valve to reach the second value.

* * * * *